(12) United States Patent
Ansaldo-Swain et al.

(10) Patent No.: US 11,655,072 B2
(45) Date of Patent: May 23, 2023

(54) FLOATING GRID ARRANGEMENT TO SUPPORT AND POSITION DECORATIVE ELEMENTS

(71) Applicant: AMCS Consulting, LLC, Ship Bottom, NJ (US)

(72) Inventors: Anne-Marie Ansaldo-Swain, Ship Bottom, NJ (US); Curtis Swain, Ship Bottom, NJ (US); Philip John Blyskal, Princeton, NJ (US); James Matthew Wittes, Princeton, NJ (US)

(73) Assignee: AMCS Consulting, LLC, Medford, NJ (US)

( * ) Notice: Subject to any disclaimer, the term of this patent is extended or adjusted under 35 U.S.C. 154(b) by 0 days.

(21) Appl. No.: 17/504,771

(22) Filed: Oct. 19, 2021

(65) Prior Publication Data

US 2022/0033144 A1    Feb. 3, 2022

Related U.S. Application Data

(63) Continuation of application No. 16/665,761, filed on Oct. 28, 2019, now Pat. No. 11,180,285, which is a
(Continued)

(51) Int. Cl.
*B65D 25/20*    (2006.01)
*F21W 121/02*    (2006.01)
(Continued)

(52) U.S. Cl.
CPC ............... *B65D 25/20* (2013.01); *A01G 5/04* (2013.01); *B65D 85/505* (2013.01); *F21V 35/00* (2013.01);
(Continued)

(58) Field of Classification Search
CPC ........ B65D 25/20; B65D 85/505; A01G 5/04; F21V 35/00; F21V 2121/02; F21V 2131/401
(Continued)

(56) References Cited

U.S. PATENT DOCUMENTS 6,475,117 B1 * 11/2002 Berglund ............. A63H 33/101
                                                    403/171
6,751,903 B2 *  6/2004 Shryock .................. A01G 9/00
                                                      47/85
(Continued)

*Primary Examiner* — J. Gregory Pickett
*Assistant Examiner* — Niki M Eloshway
(74) *Attorney, Agent, or Firm* — Fox Rothschild LLP

(57) ABSTRACT

Plastic grid or framework arrangements are used to support and position of bowls that hold flower arrangements, candles, letters, and other decorative elements. These grids are deployable in water fountains, indoor and outdoor pools, and other small bodies of water during festive occasions or for longer term decorative display. The grid themselves do not float, and are positioned below the surface of the water, and thus are not readily visible. Buoyancy is provided at the hubs that form nodes in the grids. The hubs also support floating bowls containing various decorative elements. The resulting effect is that the various decorative elements appear to be floating on the surface while the sub-surface grid structure maintains their relative positioning, keeping the bowls from clumping together at the edges or in the corners of the pool or fountain.

13 Claims, 43 Drawing Sheets

Related U.S. Application Data continuation-in-part of application No. 15/245,623, filed on Aug. 24, 2016, now Pat. No. 10,458,644.

(60) Provisional application No. 62/210,478, filed on Aug. 27, 2015.

(51) Int. Cl.
*A01G 5/04* (2006.01)
*F21W 131/401* (2006.01)
*B65D 85/50* (2006.01)
*F21V 35/00* (2006.01)

(52) U.S. Cl.
CPC ... *F21W 2121/02* (2013.01); *F21W 2131/401* (2013.01)

(58) Field of Classification Search
USPC .............................................. 220/560; 362/84
See application file for complete search history.

(56) References Cited

U.S. PATENT DOCUMENTS

| | | | | |
|---|---|---|---|---|
| 6,843,021 | B1* | 1/2005 | Huang | A01G 9/12 47/60 |
| 8,403,723 | B1* | 3/2013 | Haner | A63B 67/007 446/124 |
| 9,579,834 | B2* | 2/2017 | Delgado | A01G 31/02 |
| 2005/0274073 | A1* | 12/2005 | Brooke | A01G 31/02 47/59 R |
| 2014/0202954 | A1* | 7/2014 | Lassovsky | C02F 3/327 210/150 |
| 2015/0041376 | A1* | 2/2015 | Fulford | C02F 3/103 210/194 |
| 2017/0057696 | A1* | 3/2017 | Ansaldo-Swain | A01G 31/00 |
| 2017/0181390 | A1* | 6/2017 | Harris, Sr. | A01G 13/0237 |
| 2017/0208758 | A1* | 7/2017 | Baek | A01G 33/00 |

* cited by examiner

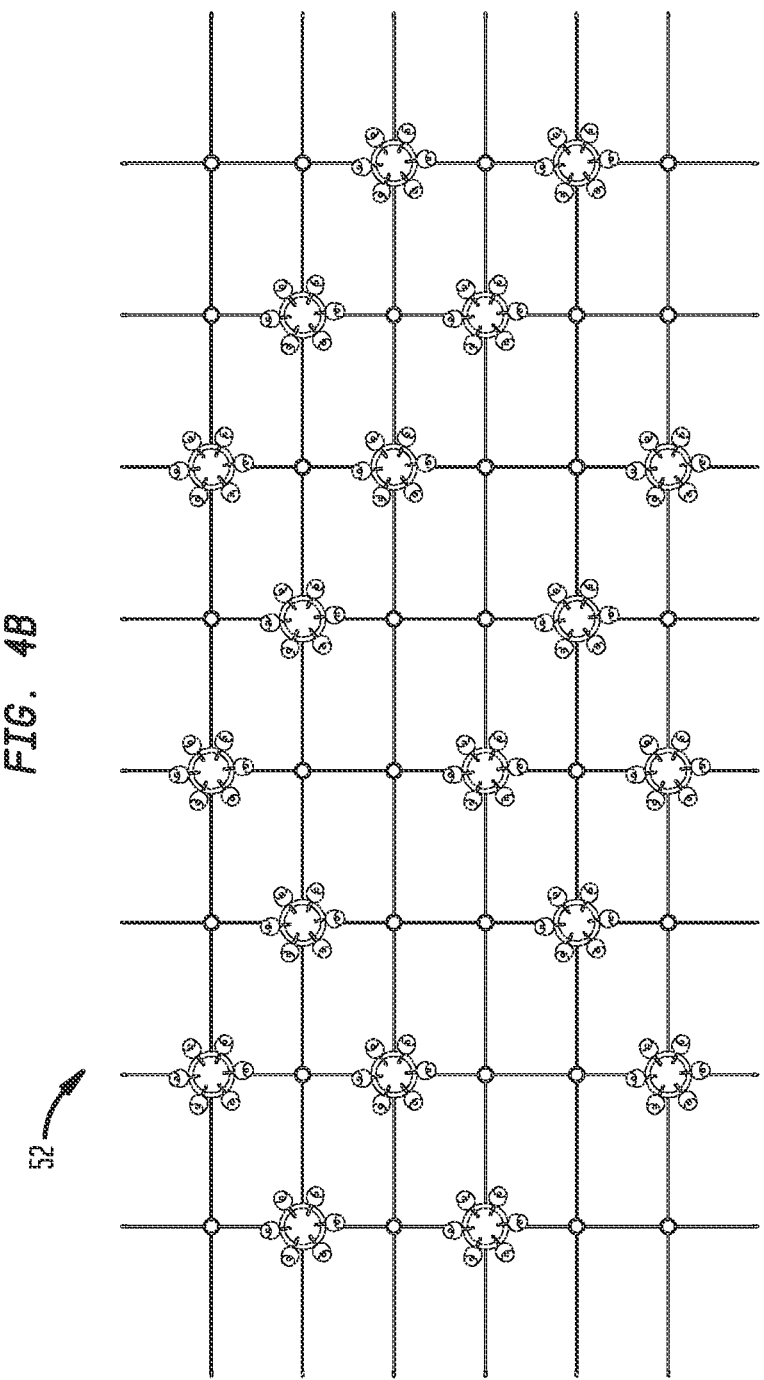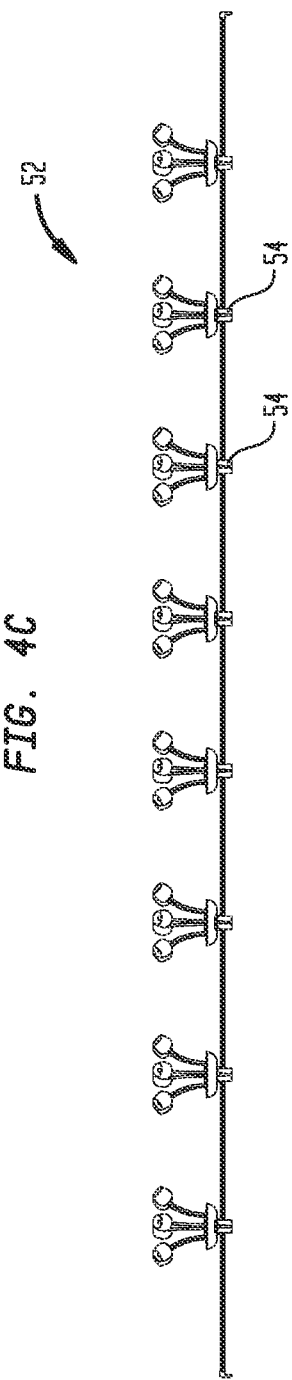

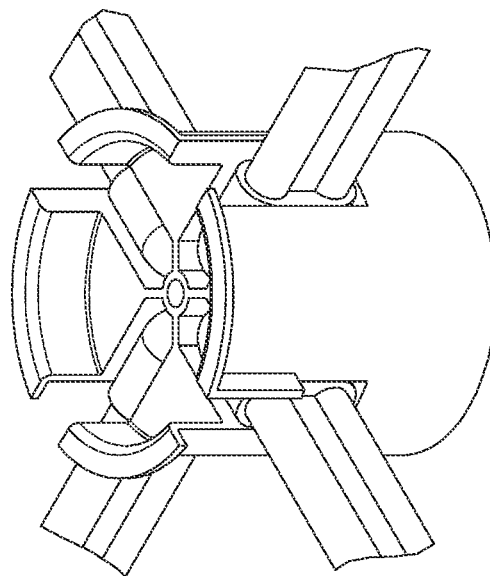
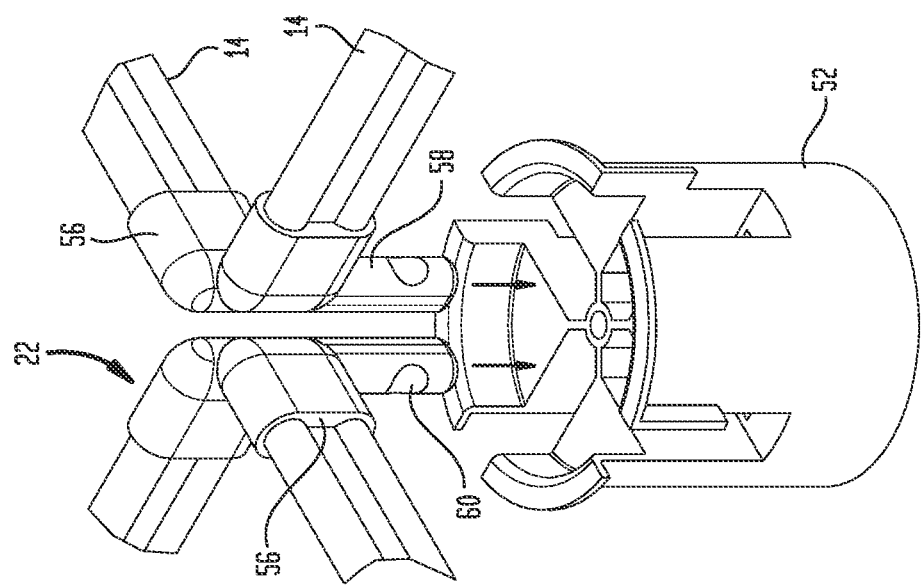

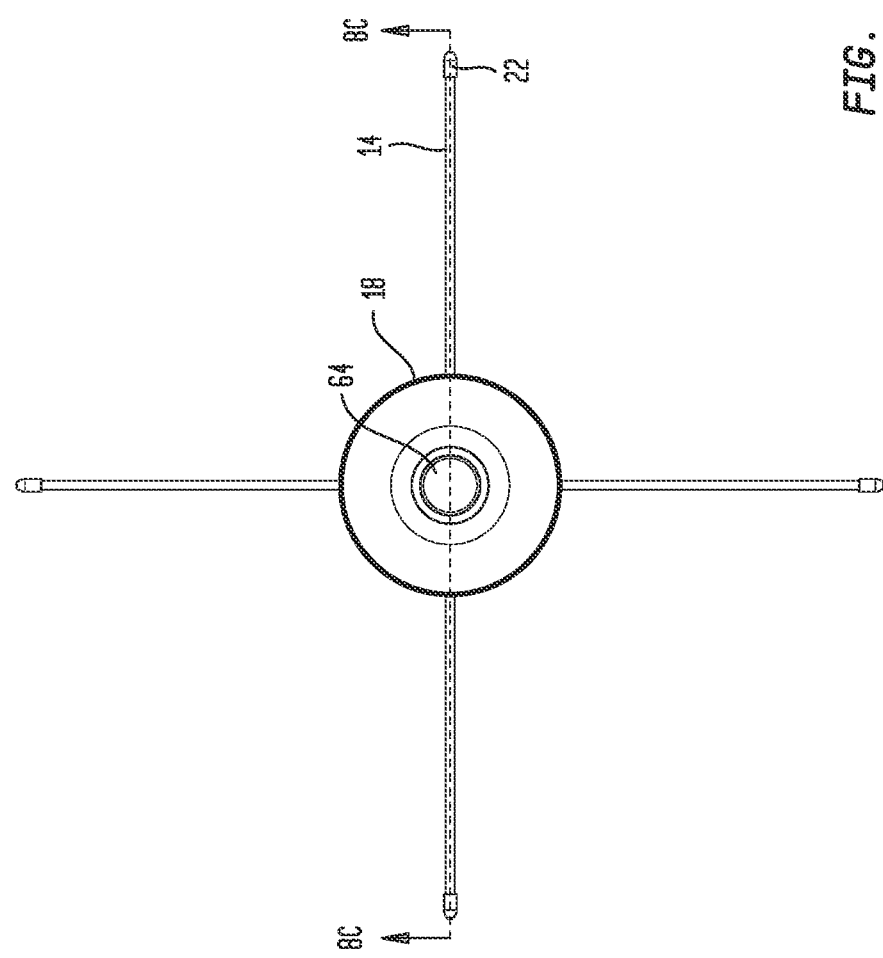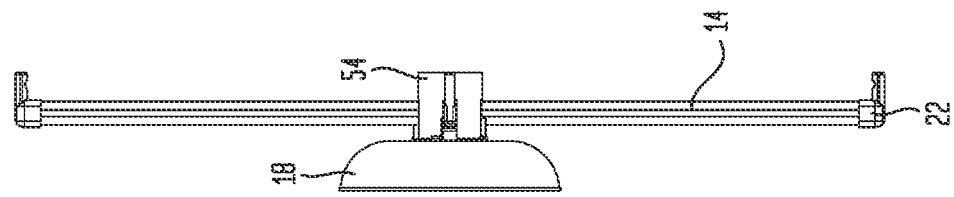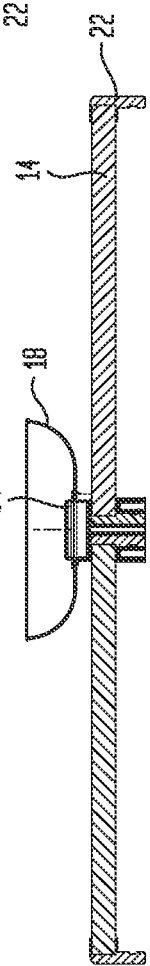

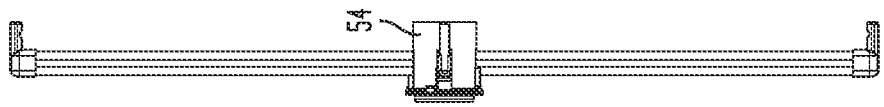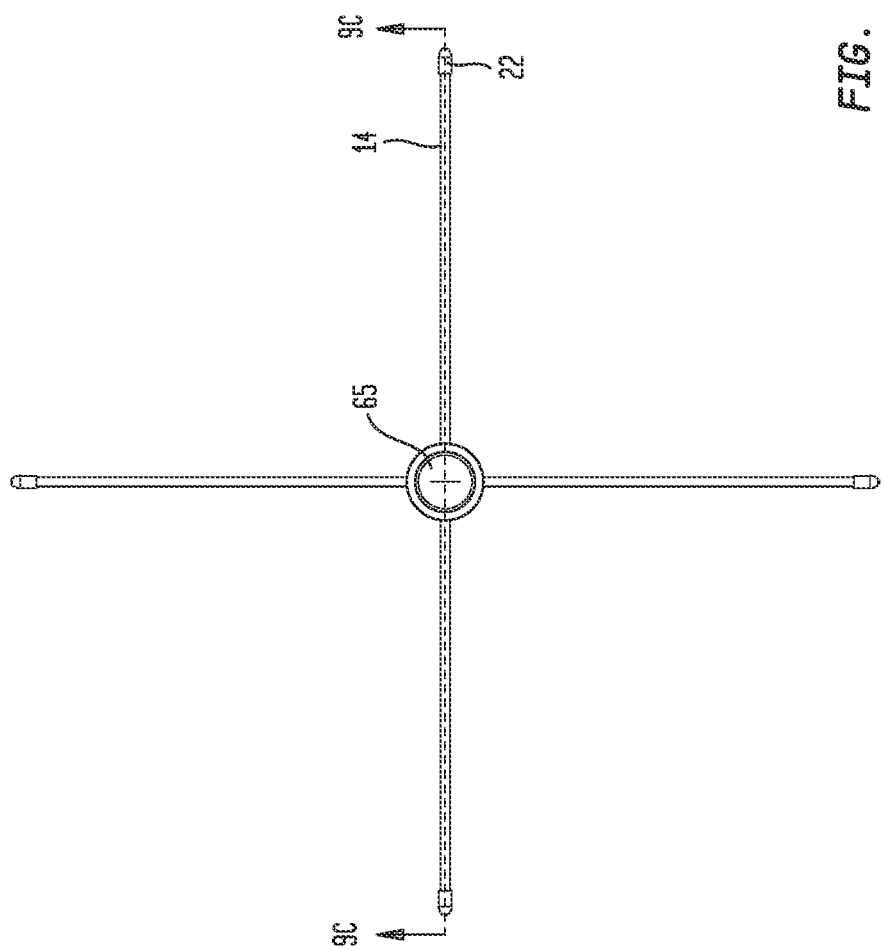

FIG. 11C
FIG. 11D
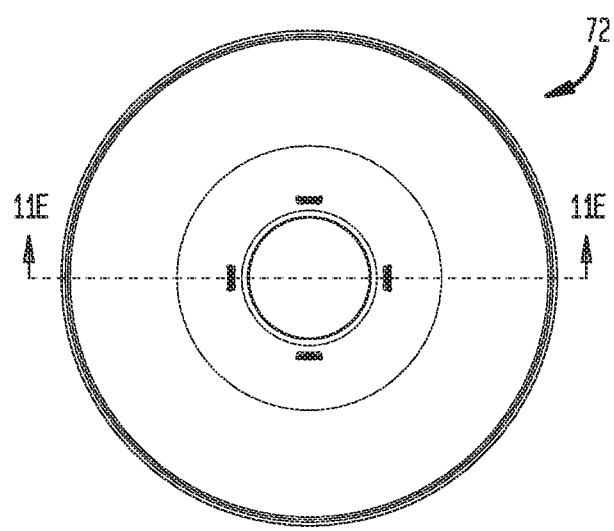
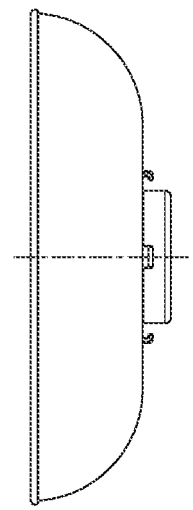
FIG. 11E
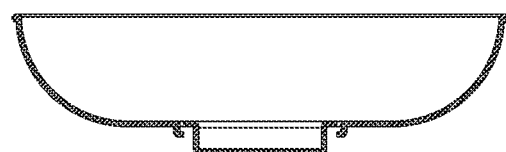

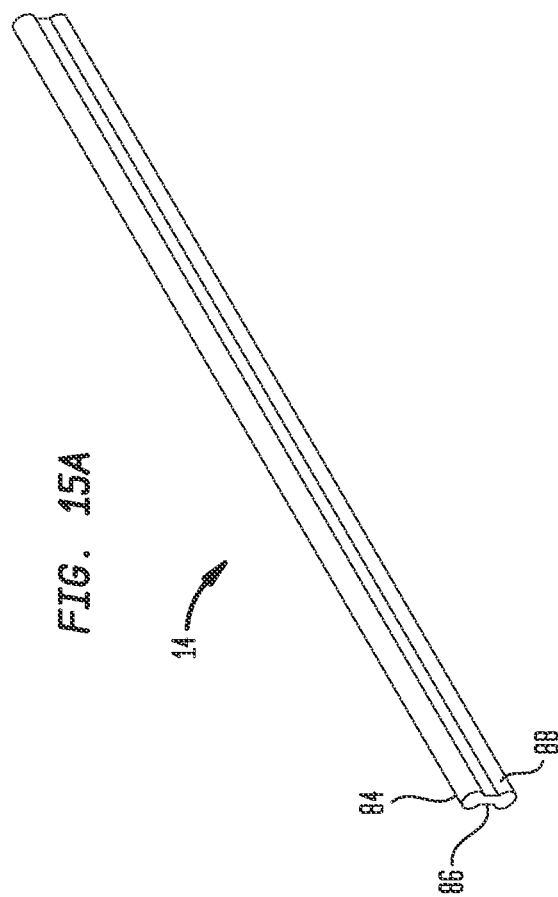
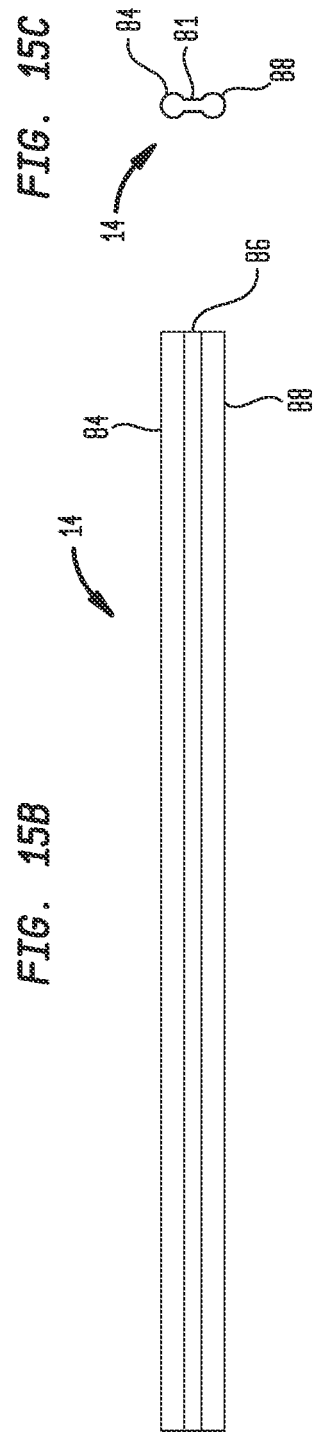

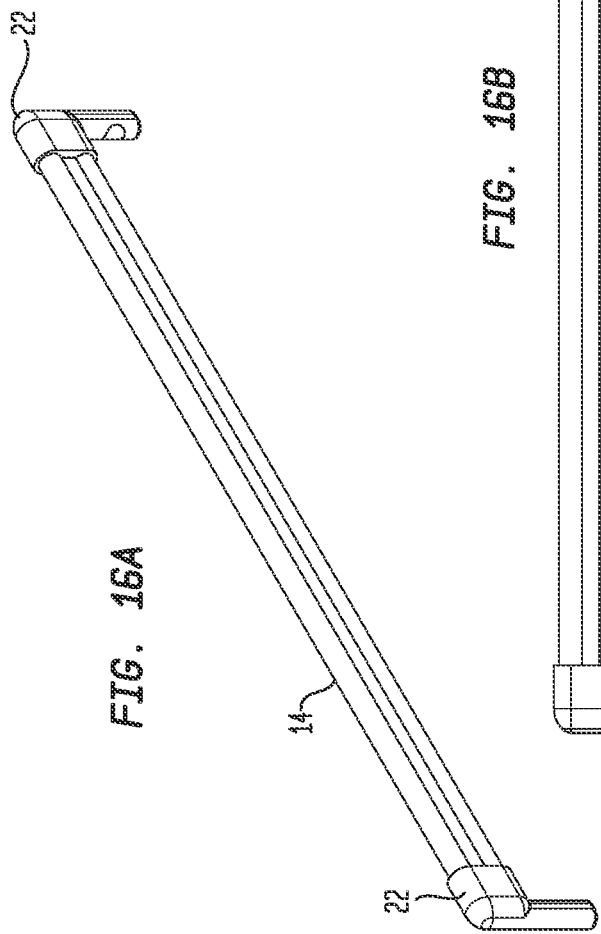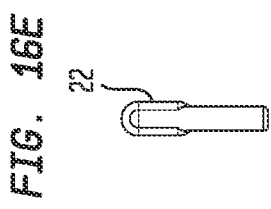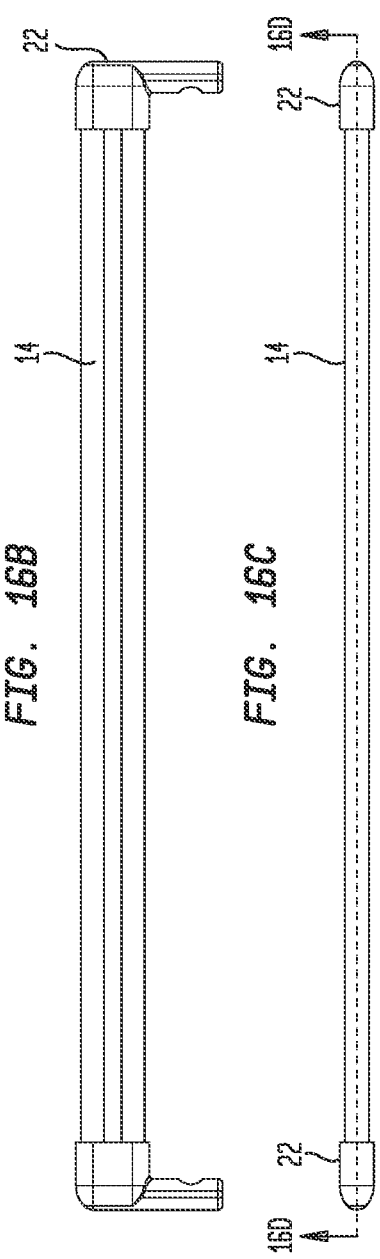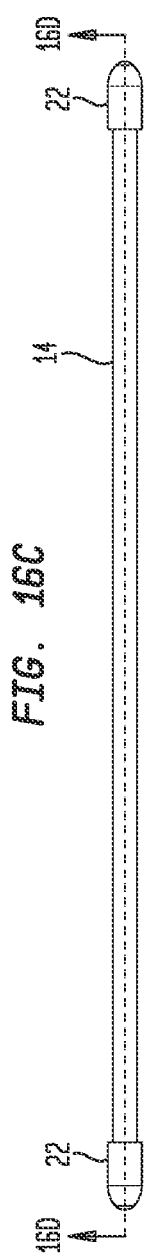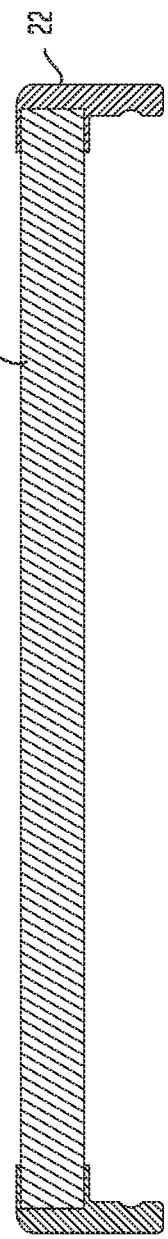

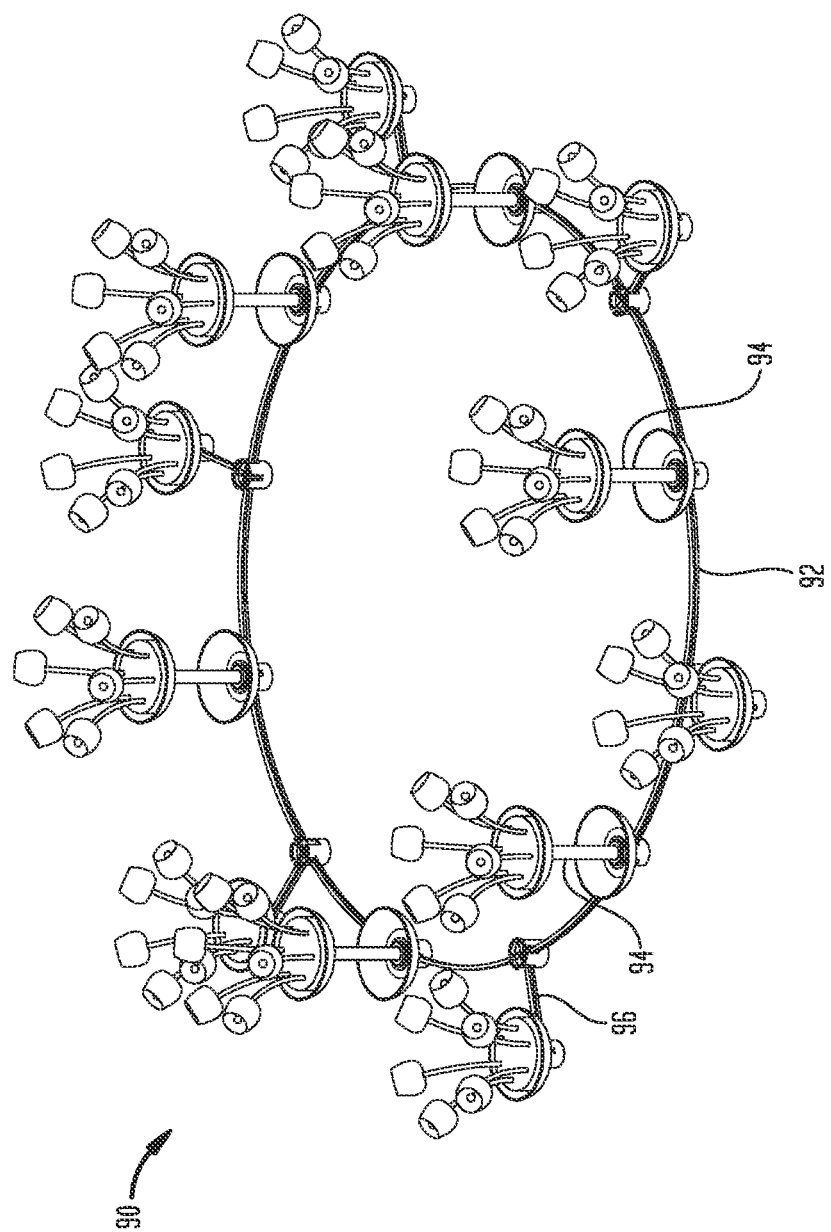

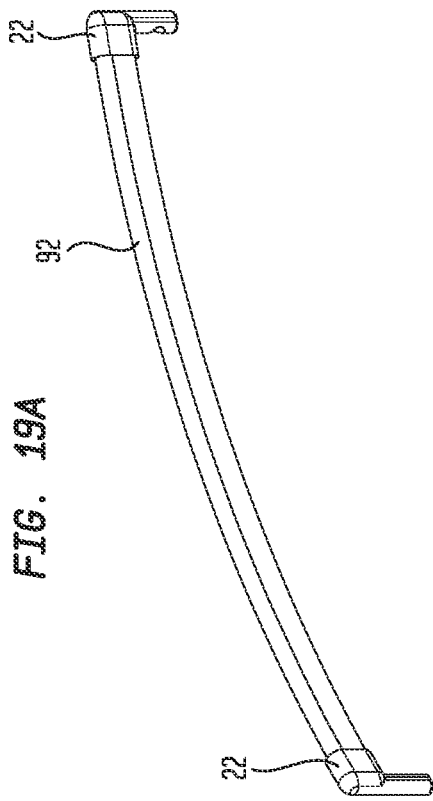
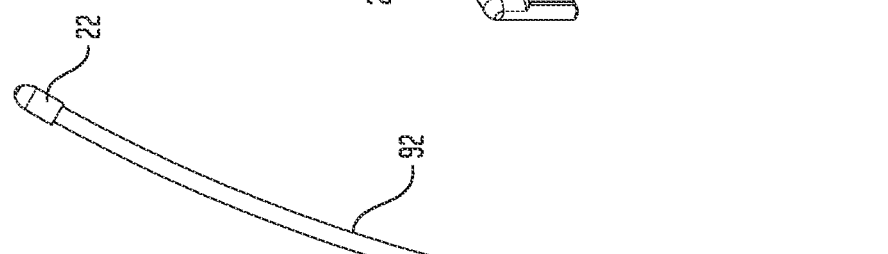
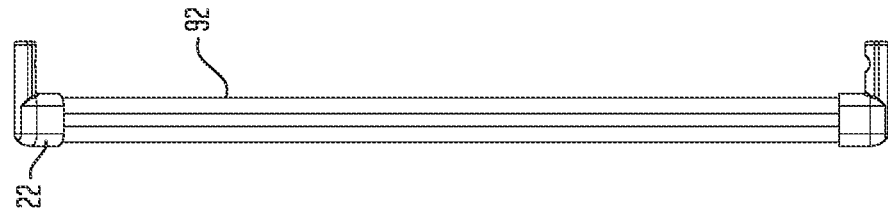
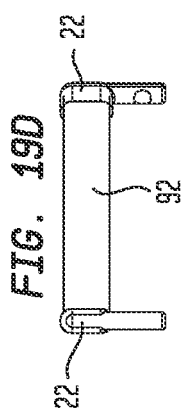

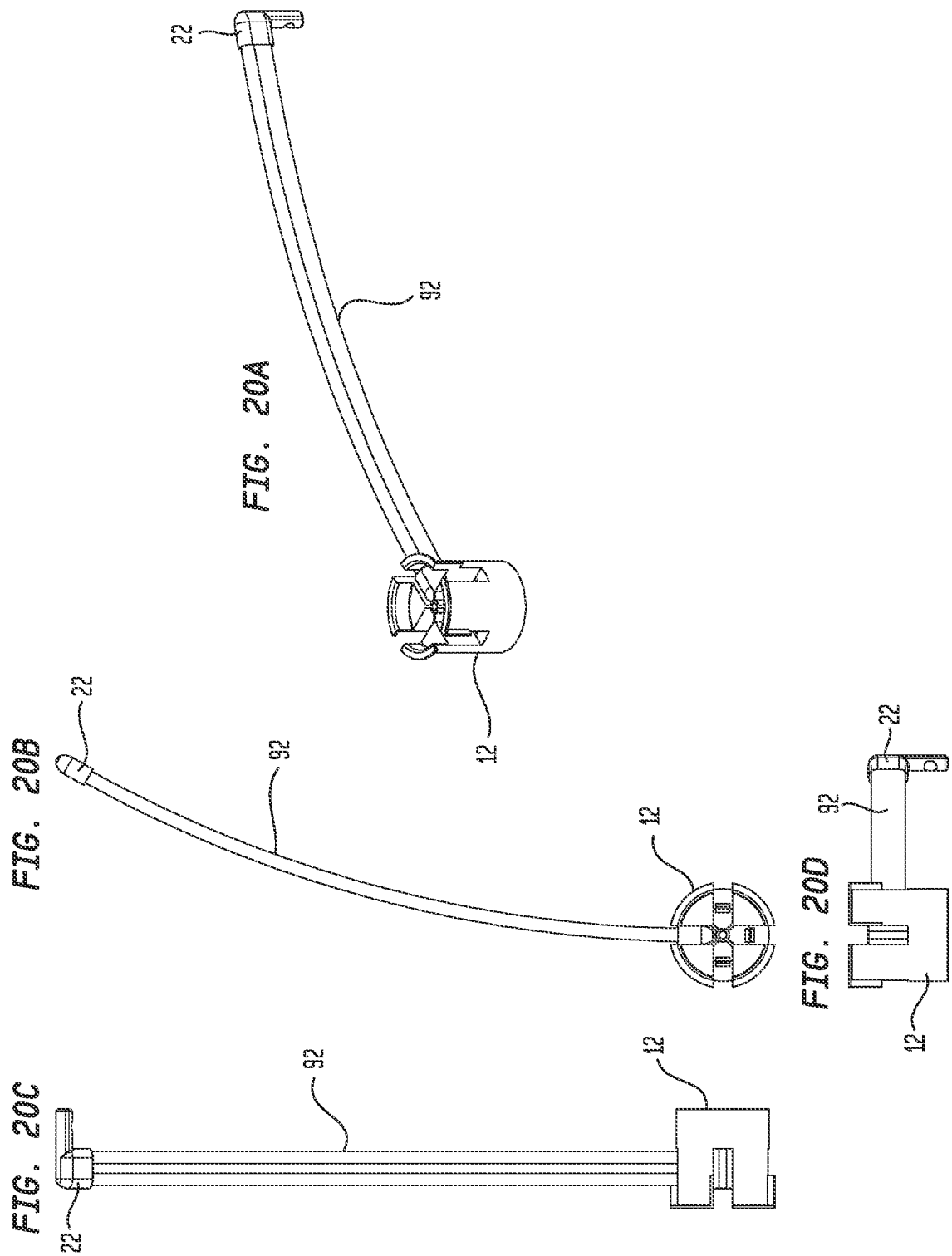

FLOATING GRID ARRANGEMENT TO SUPPORT AND POSITION DECORATIVE ELEMENTS

CROSS REFERENCE TO RELATED APPLICATIONS

This application is a continuation of U.S. application Ser. No. 16/665,761, filed 28 Oct. 2019.

The '761 application in a continuation-in-part of U.S. application Ser. No. 15/245,623, filed Aug. 24, 2016, now U.S. Pat. No. 10,458,644, granted 29 Oct. 2019.

The '623 application claims the benefits of U.S. provisional application No. 62/210,478, filed Aug. 27, 2015.

The contents of each of these applications are incorporated by reference herein in their entireties.

BACKGROUND

Field

The inventive concepts disclosed herein relate to a floating grid that can be assembled to support decorative elements such as flowers or candles in a small body of water.

Description of the Prior Art

The prior art discloses various floating devices that support decorative elements such as flowers and candles for use in small bodies of water such as swimming pools or ponds. The following U.S. and foreign patent references are typical.

U.S. Pat. No. 6,220,718 discloses a floating candle device comprising: a candle enclosure, a candle base having upper and lower portions, a grommet dimensioned and configured to fit into said opening in said lower portion of said candle base, wherein said floating candle device is arranged with other floating candle devices into letters and shapes (FIGS. 1-6; Column 7, Lines 67-69; Column 8, Lines 1-4; Claims 7-11).

U.S. Pat. No. 6,025,042 discloses an artificial lily pad made with polyester fabric flower petals, molded polypropylene or polyethylene stamens and stigmata, ethylene vinyl acetate leaves, polystyrene foam pads, and a bottom anchor ring. An anchor weight is attached to the bottom anchor ring by a monofilament nylon line which is colorless in water (FIGS. 1-3; Column 2, Lines 49-58; Claim 1).

2007/0107117 discloses a fountain kit for outfitting a swimming pool that comprises a water fountain assembly and a water pump assembly, including a plurality of fountain water outlets interconnected by a common conduit, which common conduit and which water outlets are mountable in adjacency to an upper pool periphery (FIGS. 1-8; Paragraphs [0042]-[0046]; Claims 16-21).

WO 2014197517A1 discloses a water purification apparatus comprising injection moulded floating non-toxic, biodegradable, and recyclable polymer planar structures (Claim 2; FIG. 4).

2007/0137100 discloses a floatable plant cultivation system (FIGS. 2 and 3).

U.S. Pat. No. 6,014,838 discloses a floatable unit for displaying foliage on ponds (FIGS. 2 and 6).

The following patents show other floating plant structures of possible relevance: U.S. Pat. No. 6,751,903; 2012/0174480 A1; and, 2008/0230010 A1. In addition, U.S. Pat. No. 1,188,198 discloses a floating plant support system for artificial flowers.

The following non-patent literature articles describe structure of possible relevance.

Adminkak "Flower vase arrangement" kianaa.com, Mar. 2, 2014 http://kianaa.com/diy/arrangment/flower-vase-arrangement/ discloses the use of "tape to make a grid on wide open bowls and vases. The grid makes it easier to decorate flowers."

1Man1Garage, "Floating Pavilion for Outdoor Party Lighting in a Pool or Pond. Decorate the large platform to suit your needs and Decor," Etsy.com, accessed: July 2016. https://www.etsy.com/listing/195649848/floating-pavilion-for-outdoor-party discloses "a solid foam core that keeps the wood shell able to ride out a gentle roll of waves, underneath is an anchor point hidden from view to tether the platform to each other, or solid ground."

The following U.S. patent references may also be relevant: U.S. Pat. Nos. 9,033,326, 7,406,798, 7,000,347, 5,934,796, 5,758,452, 5,722,347, 4,588,618, 3,089,155, 2,531,562, 2015/0027047, 2002/0184818.

The following foreign patent references may also be relevant:

WO 2005110167A1 JPH 1136122A

It was in the context of the above prior art that the embodiments disclosed herein arose.

SUMMARY

A plastic grid or framework arrangement is used to support and position a series of bowls that hold flower arrangements, candles, letters, and other decorative elements. The grid is deployable in water fountains, indoor and outdoor pools, ponds, and other small bodies of water during festive occasions or for longer term decorative display. An important feature of this product is that the grid itself does not float and is positioned below the surface of the water, and thus is not readily visible. Buoyancy is provided at the hubs that form nodes in the grid. The hubs also support floating bowls having a sealed air chamber, according to the preferred embodiment, and containing various decorative elements. Another possible alternative embodiment is a bowl without bottom slots and without a float chamber. The resulting effect is that the decorative elements appear to be floating on the surface while the sub-surface grid structure maintains their relative positioning, keeping the bowls from clumping together at the edges or in the corners of the pool or fountain.

The embodiments can be assembled quickly from a kit of standardized components and can be quickly dis-assembled and stored for future use. The spokes that radiate from each of the hubs include an end cap that can be easily snapped into position on the hubs when the apparatus is assembled. The underlying floating framework can take several forms including a grid or a ring and may also include horizontal and vertical extensions for extending the decorative elements in a plane horizontal or vertical to the plane of the framework. When the user is finished with the display it is easily disassembled by pulling the spoke end caps out of the hubs and unsnapping them from the retention springs securely held in one of a plurality of pockets in each hub. After disassembly, the entire set of components can be stored in a compact box or bag and saved for reuse at a subsequent event.

In one aspect, embodiments of floating apparatuses for supporting decorative elements in water include a hub comprising an outer wall, and a plurality of interior walls attached to the outer wall, the outer wall and the interior walls defining a plurality of pockets; at least two spokes. The embodiments also include a float configured to be attached to the hub; a decorative element support bowl configured to be attached to the hub; and at least two spoke end fittings.

The pockets are configured to receive the spoke end fittings. Each of the spoke end fittings has a first portion, and a second portion attached to the first portion. The first portion has an opening configured to receive a portion of one of the spokes; and the second portion is configured to securely engage at least one of the interior walls of the hub when the spoke end fitting is positioned in one of the pockets.

In another aspect, the interior walls comprise a plurality of tabs, and the second portion is configured to securely engage at least a first of the tabs when the spoke end fitting is positioned in one of the pockets.

In another aspect, the second portion of the spoke end fitting is configured to resiliently deflect in response to contact with the first tab when the spoke end fitting is inserted into one of the pockets.

In another aspect, the second portion of the spoke end fitting includes a first and a second sidewall each attached to the first portion of the spoke end fitting; and a first and a second indented portion attached respectively to the first and second sidewalls. The first and second indented portions are configured to engage the first and a second of the tabs, respectively, when the spoke end fitting is positioned in one of the pockets. The second portion of the spoke end fitting also includes an end portion attached to the first and second indented portions.

In another aspect, the first and second indented portions each define a depression, and the first and second tabs are positioned in a respective one of the depressions when the spoke end fitting is positioned in one of the pockets.

In another aspect, the first and second sidewalls and the end portion are configured to flex as the end portion passes over the first and second tabs during insertion of spoke end fitting into one of the pockets.

In another aspect, each of the spoke end fittings further comprises a web attached to the first and second portions of the spoke end fitting; and the outer wall and the interior walls of the hub define a plurality of slots configured to receive a respective one of the webs when the spoke end fitting is inserted in one of the pockets.

In another aspect, the first and second sidewalls are substantially straight, and the end portion is curved.

In another aspect, the apparatuses also includes a bowl adapter having a sidewall, a first lip attached to a first end of the sidewall, and a second lip attached to a second end of the sidewall. The first lip is configured to securely engage the bowl.

In another aspect, the hub includes a plurality of tabs, and the second lip is configured to securely engage the tabs.

In another aspect, the tabs are disposed proximate an upper edge of the hub.

In another aspect, the hub includes a plurality of upper segments, and the tabs are disposed on the upper segments.

In another aspect, the upper segments of the hub and the second lip of the bowl adapter are configured to resiliently deflect in response to contact between the tabs and the second lip when the hub is mated with the bowl adapter.

In another aspect, at least a portion of the second lip of the bowl adapter is disposed at an acute angle in relation to the sidewall of the bowl adapter.

In another aspect, the first lip and the sidewall of the bowl adapter are substantially perpendicular.

The inventive embodiments may be more fully understood by reference to the following drawings.

BRIEF DESCRIPTION OF THE DRAWINGS

FIGS. 4A, 4B and 4C show a square grid framework for supporting decorative flower holders using hubs that have four spoke engaging pockets according to another alternative embodiment.

FIGS. 6A and 6B illustrates the manner in which the spoke end caps snap into and engage the retention springs in the pockets of a four pocket hub.

FIGS. 8A, 8B and 8C illustrate how a decorative element support bowl is attached to a hub and how the spokes radiate from the hub.

FIGS. 9A, 9B and 9C illustrate the hub and spoke frame arrangement of FIGS. 8A-8C with the decorative element support bowl removed and replaced by the float subassembly visible above the hub.

FIGS. 11A, 11B, 11C, 11D and 11E illustrate another embodiment of the decorative bowl in which the bottom of the float is formed by the bottom of the bowl.

FIGS. 15A, 15B and 15C illustrate a typical spoke.

FIGS. 16A, 16B, 16C, 16D and 16E illustrate a spoke such as seen in FIGS. 15A-15C with end caps attached.

FIGS. 18A, 18B and 18C illustrate an embodiment which includes vertical and horizontal extenders for the decorative element holding bowls.

FIGS. 19A, 19B, 19C and 19D illustrate an alternative embodiment in which the spokes are curved.

FIGS. 20A, 20B, 20C and 20D illustrate the manner in which a curved spoke of FIGS. 19A-19D engages a hub.

DETAILED DESCRIPTION

During the course of this disclosure like numbers will be used to identify like elements according the different views of the disclosed embodiments.

Figure 1A:
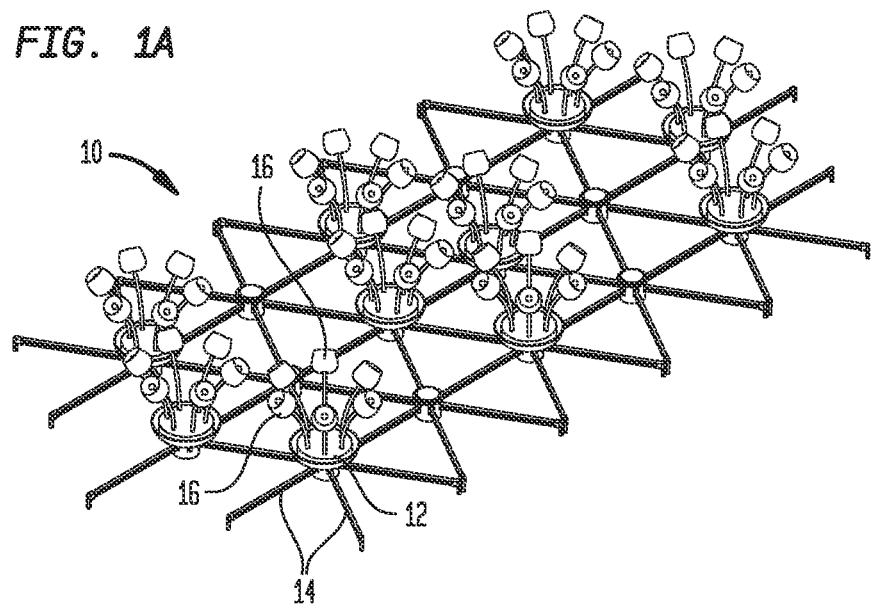
FIGS. 1A, 1B and 1C show a triangular grid framework for supporting decorative flower holders using hubs that have six spoke engaging pockets according to the preferred embodiment.
Figure 1B:
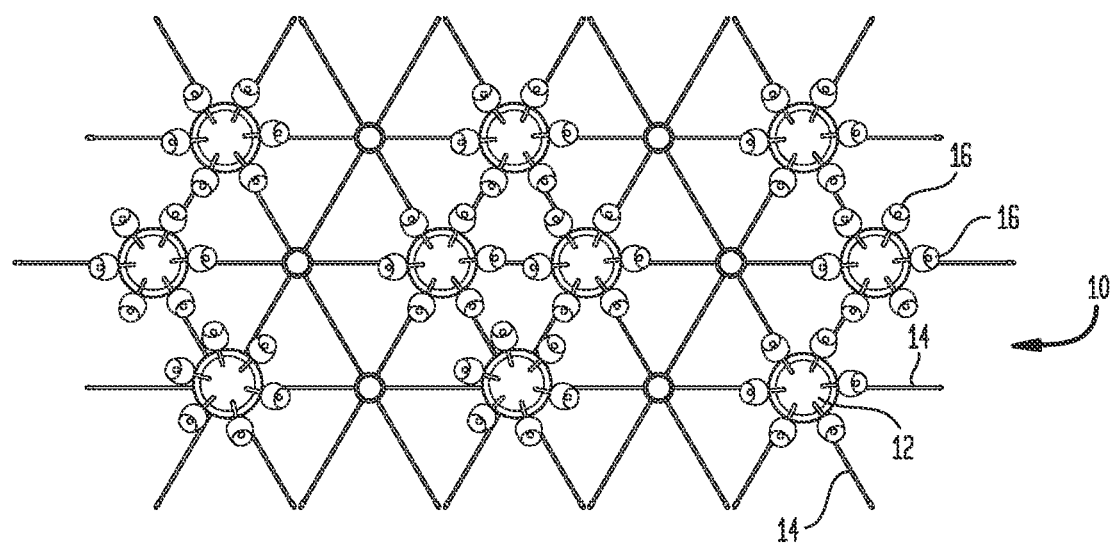
Figure 1C:
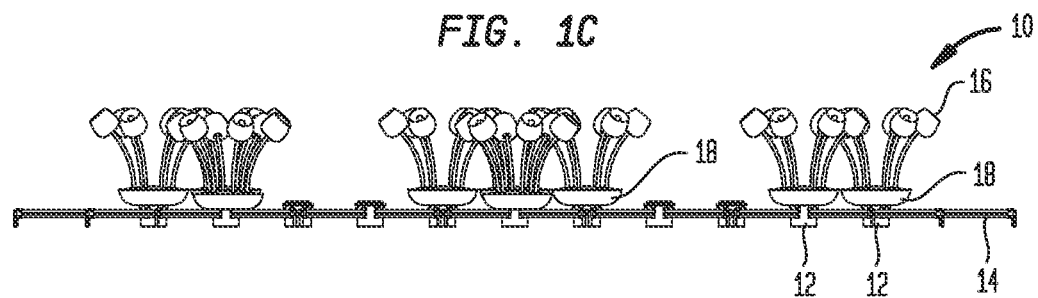

FIGS. 1A-1C show a triangular grid framework for supporting decorative flower holder bowls 18 using hubs 12 that have six spoke engaging pockets 32 according to the embodiment 10. The bowls 18 support flowers 16, or candles, or other decorative objects. Spokes 14 connect to the hubs 12 in a series of repeating patterns suggestive of triangles.

Figure 2C:
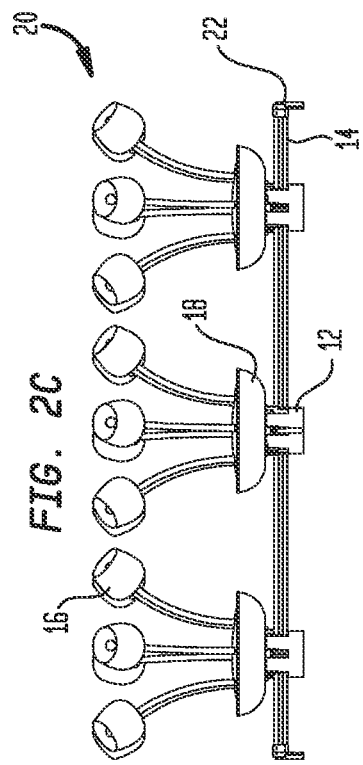
FIGS. 2A, 2B and 2C show an alternative framework arranged in the form of a ring.
Figure 2B:
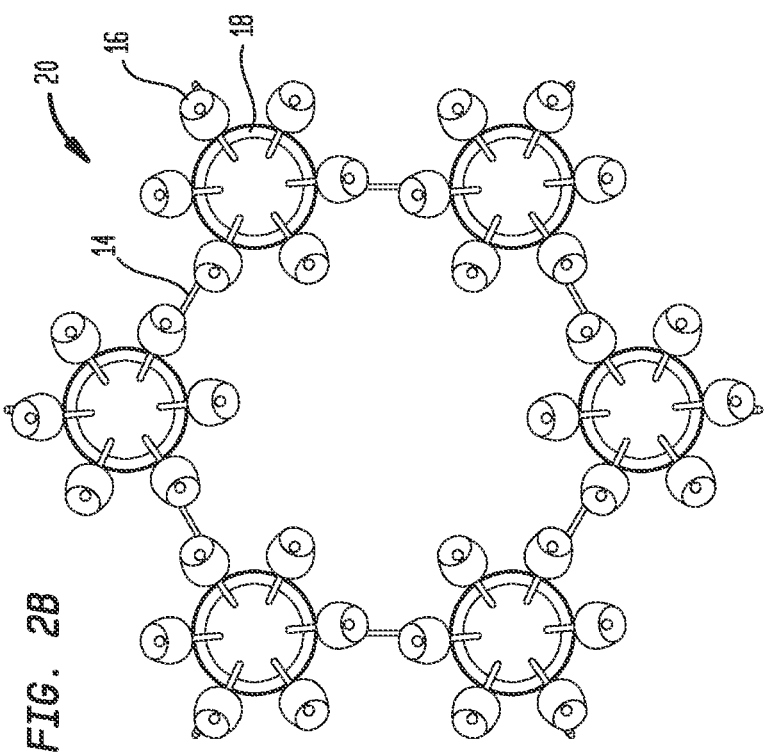
Figure 2A:
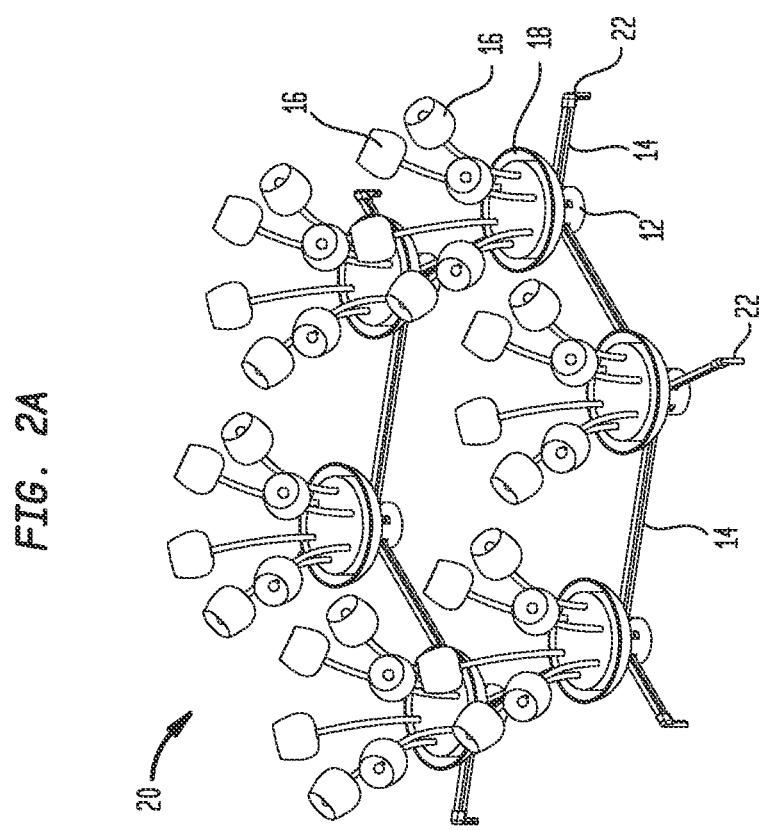

FIGS. 2A-2C show an alternative framework arranged in the form of a ring 20.

Figure 3A:
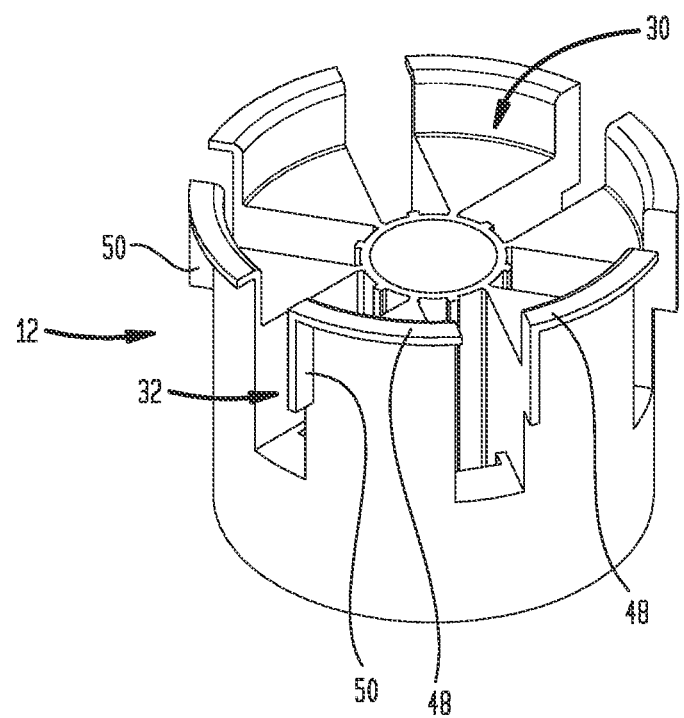
FIGS. 3A, 3B, 3C, 3D and 3E illustrate details of a six pocket hub and further indicating how the spoke retention springs are inserted into each hub pocket.
Figure 3B:
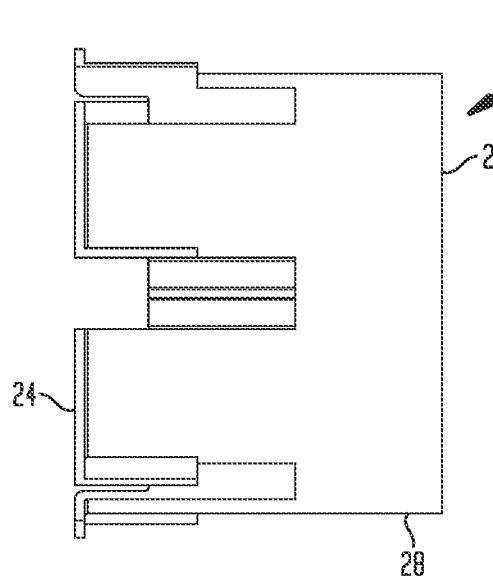
Figure 3C:
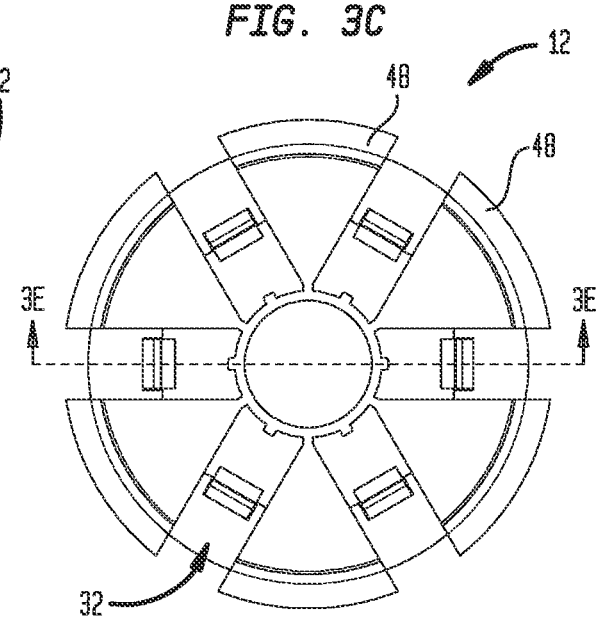
Figure 3D:
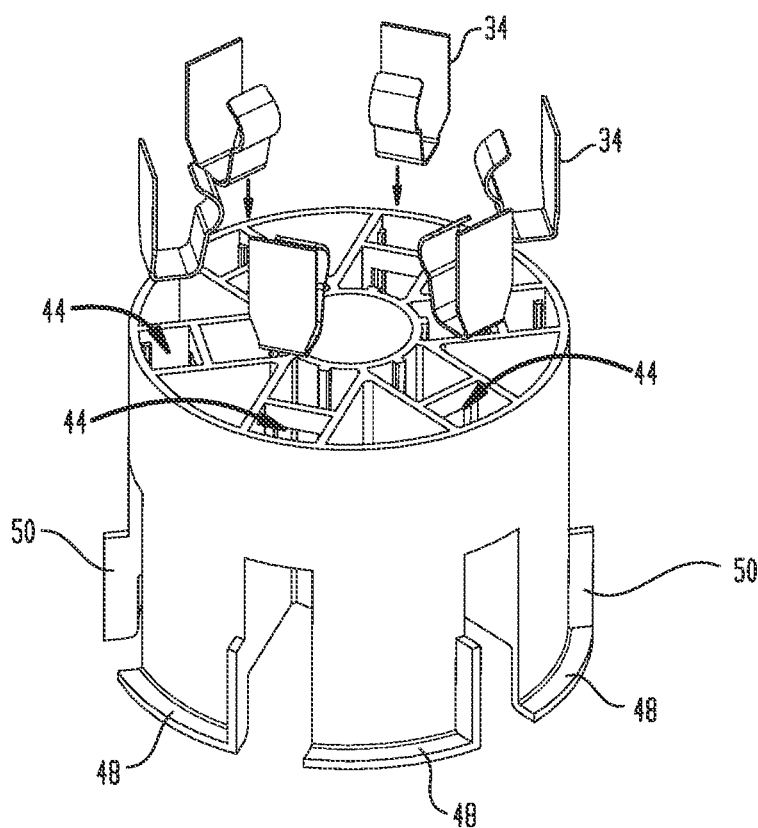
Figure 3E:
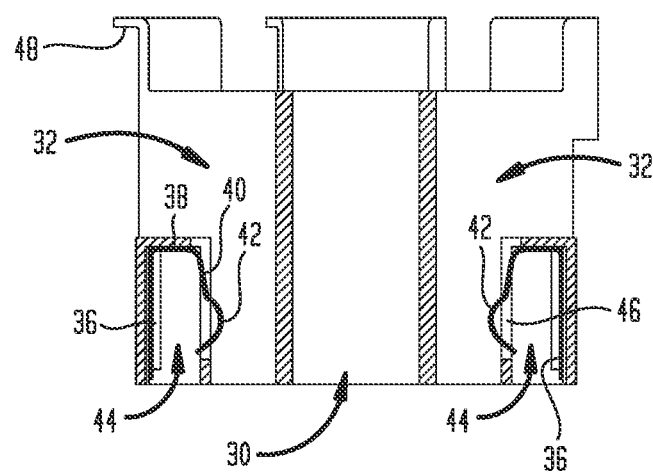

FIGS. 3A-3E illustrate details of the six pocket hub 12 and further indicating how the spoke retention spring clips 34 are inserted into and permanently attached in each of the hub pocket 44. Each hub 12 includes a top side 24, a base 26, a sidewall 28 and a hollow central aperture 30. Six slots 32 are located evenly spaced around the sidewall 28. Six springy clips 34, described in detail in FIGS. 17A-17E, are insertable in the pockets 44 as seen in FIGS. 3E and 3D. The clips 34 include a flat first arm section 36, a flat bottom section 38 and a second opposing arm section 40. Second arm section 40 includes a convex bump 42 that selectively engages the detent 60 on the spoke end cap 22 shown in further detail in FIGS. 7A-7F. Each of the pockets 44 includes an aperture 46 for framing the protruding bump 42 which in turn is engages with the detent 60 on the end cap 22. The top 24 of the hub 12 includes a circumferential flat flange portion 48 and a downward side panel 50 that depends therefrom. The six pockets 44 on the hub 12 are spaces 60 degrees apart and, accordingly, can be used to form triangular grid frameworks as shown in FIGS. 1A-1C or the circular framework of FIGS. 2A-2C.

Figure 4A:
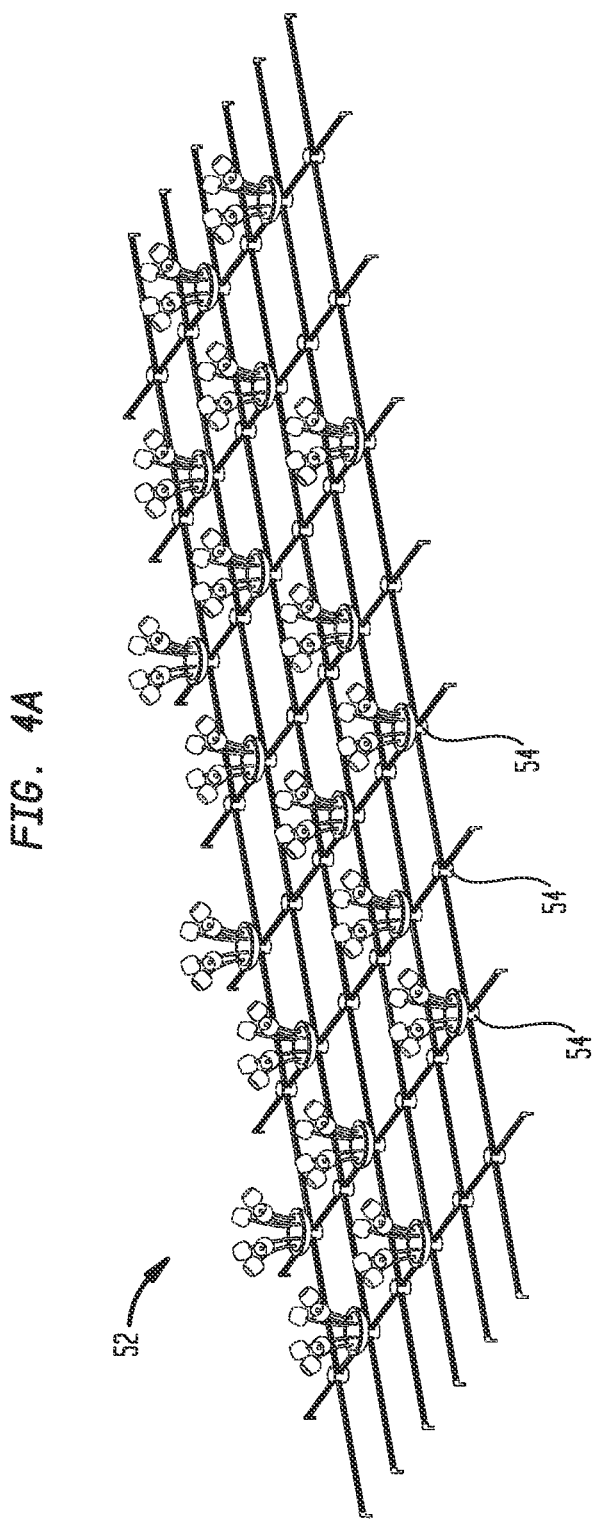
Figure 5A:
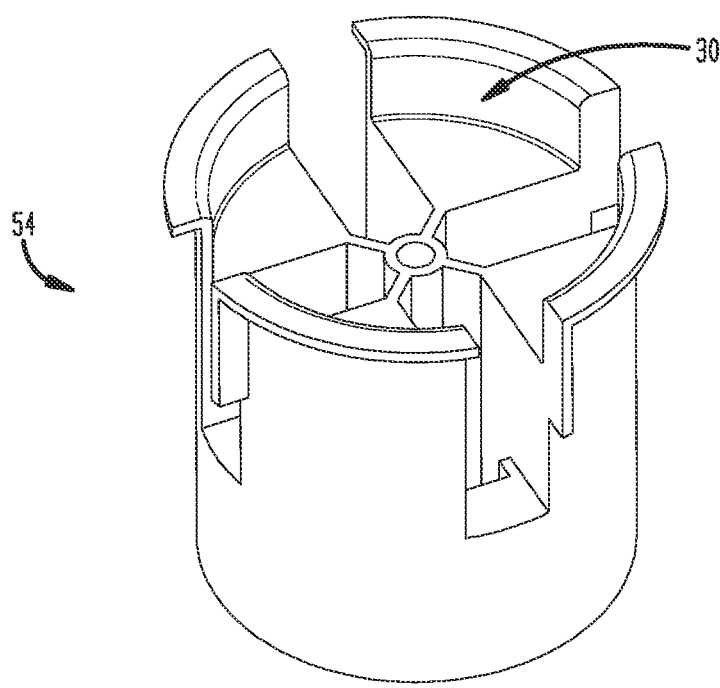
FIGS. 5A, 5B, 5C, 5D, 5E, 5F and 5G illustrate details of a four pocket hub and further indicating how the spoke retention springs are inserted into each hub pocket.
Figure 5B:
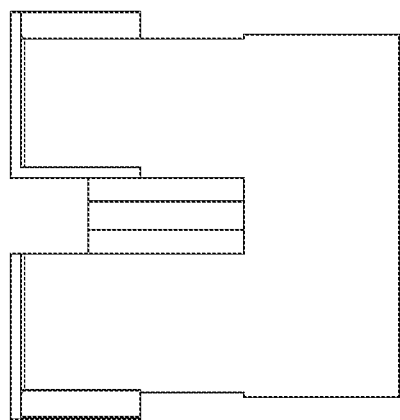
Figure 5C:
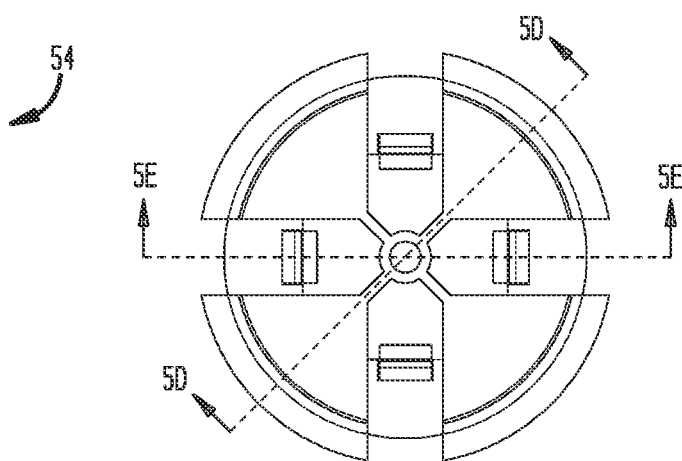
Figure 5D:
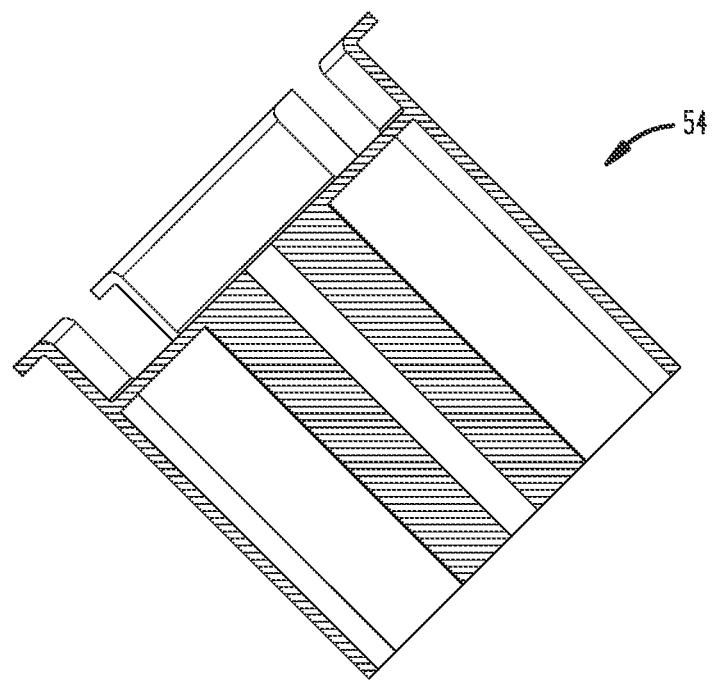
Figure 5E:
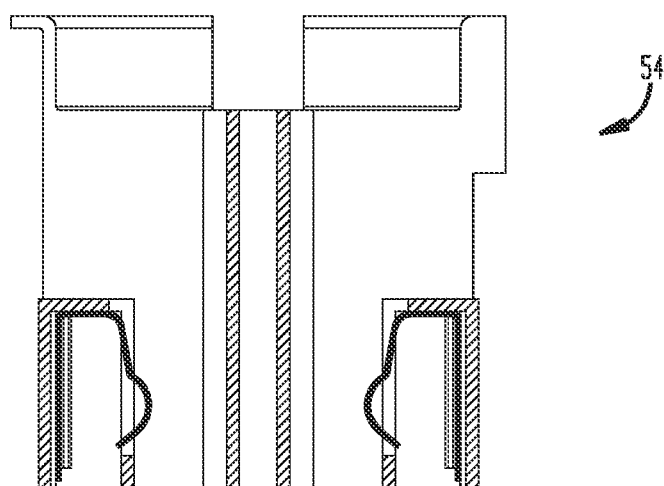
Figure 5F:
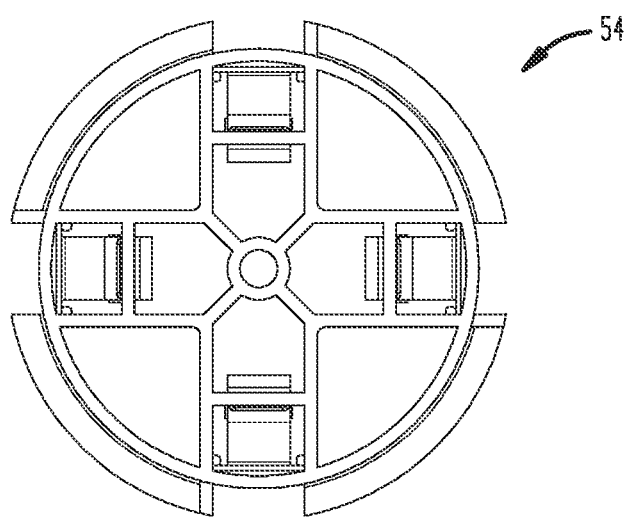
Figure 5G:
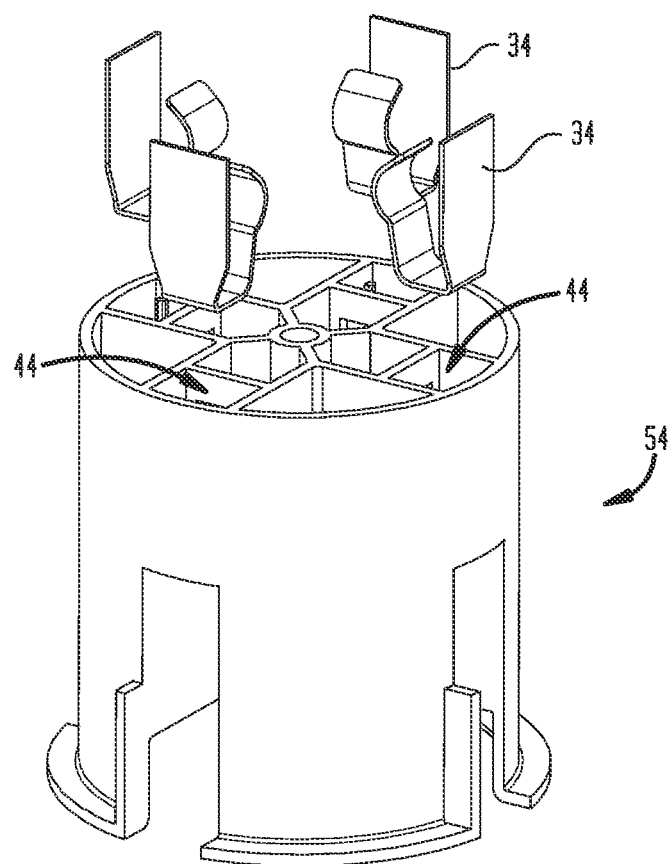
Figure 7A:
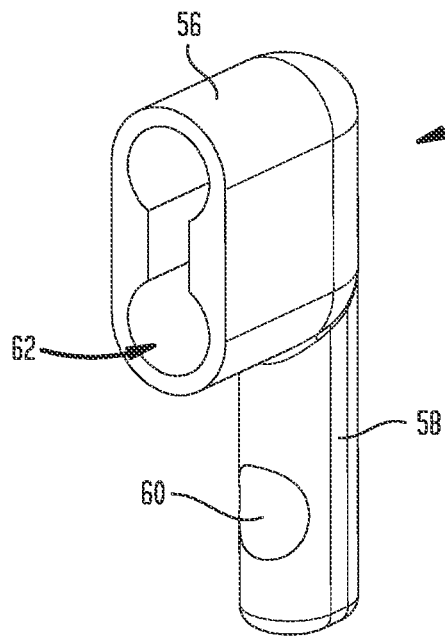
FIGS. 7A, 7B, 7C, 7D, 7E and 7F illustrate details of a spoke end cap.
Figure 7B:
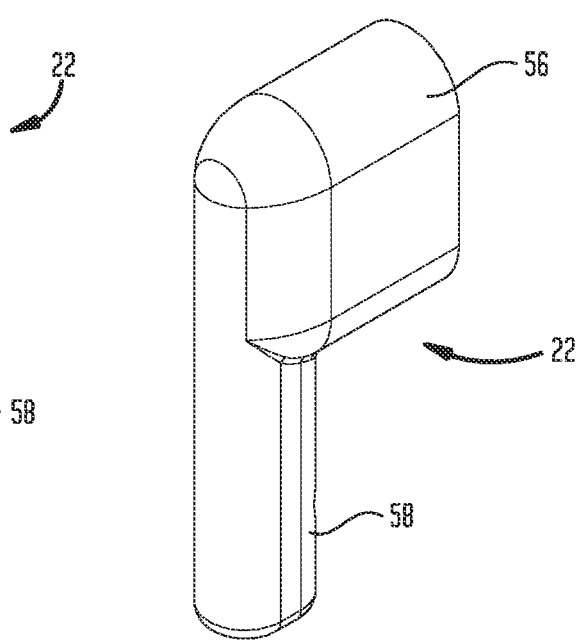
Figure 7C:
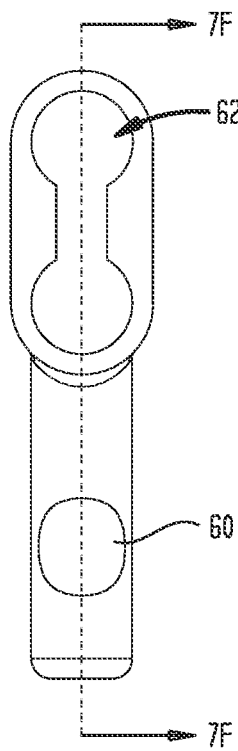
Figure 7D:
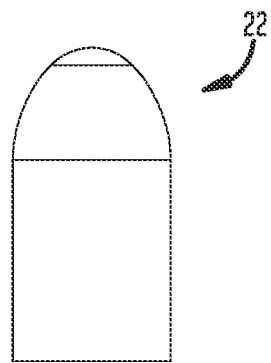
Figure 7E:
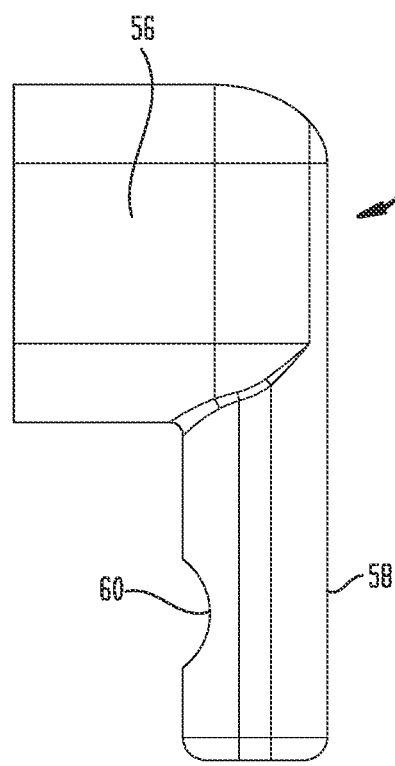
Figure 7F:
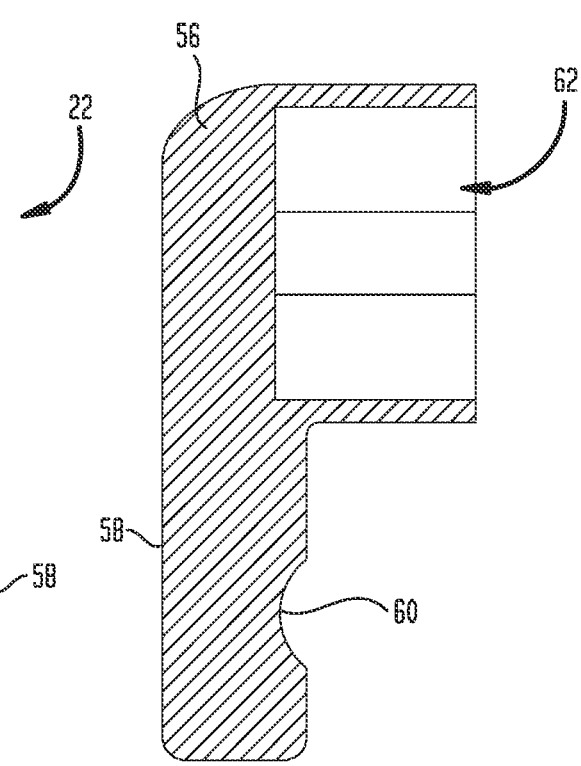
Figure 10A:
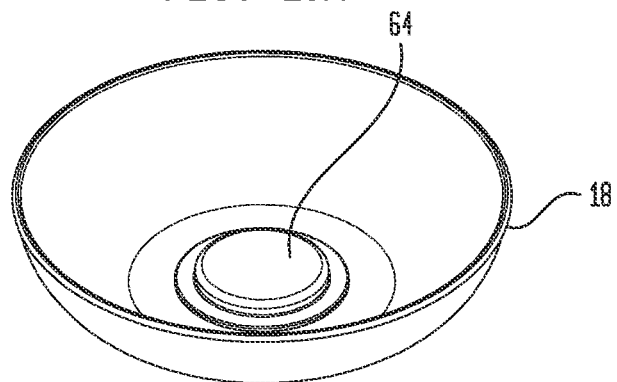
FIGS. 10A, 10B, 10C, 10D, 10E and 10F illustrates the decorative element support bowl prior to the attachment of the float chamber cap 82.
Figure 10B:
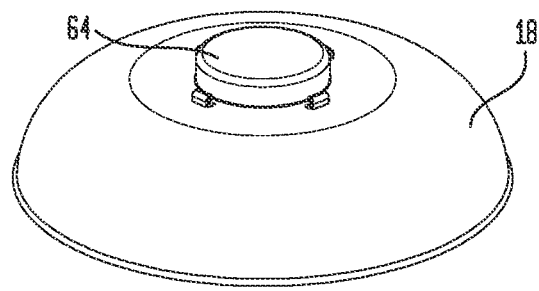
Figure 10C:
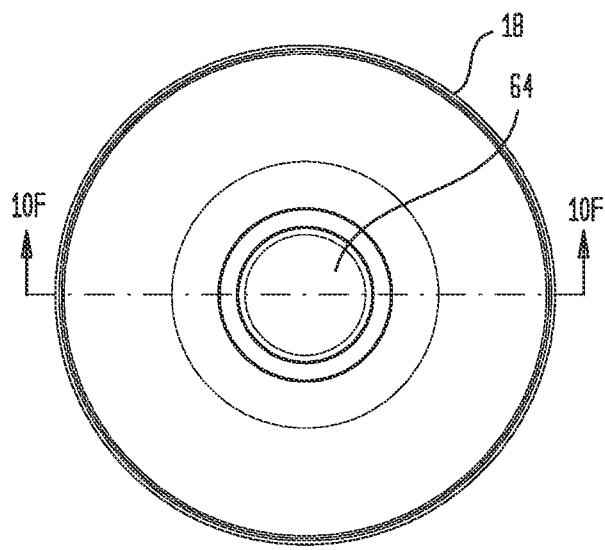
Figure 10D:
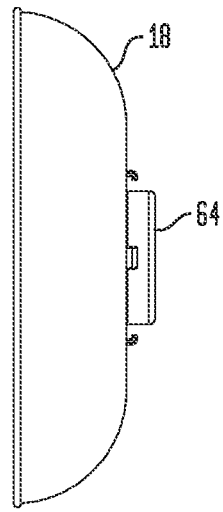
Figure 10E:
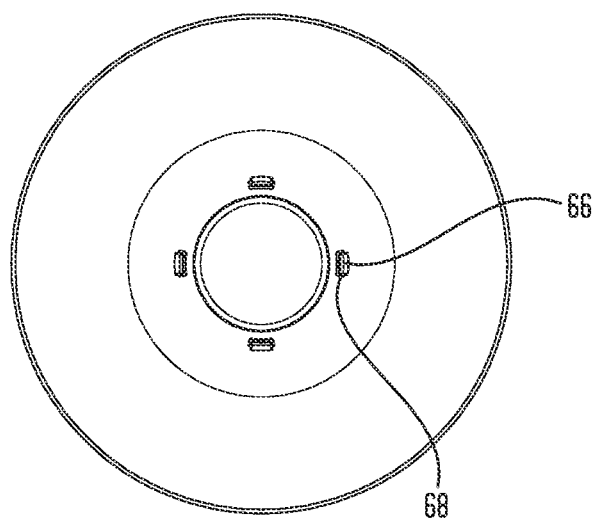
Figure 10F:
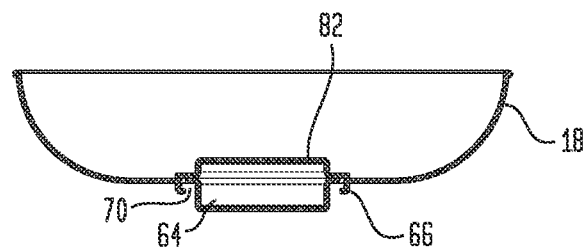
Figure 11A:
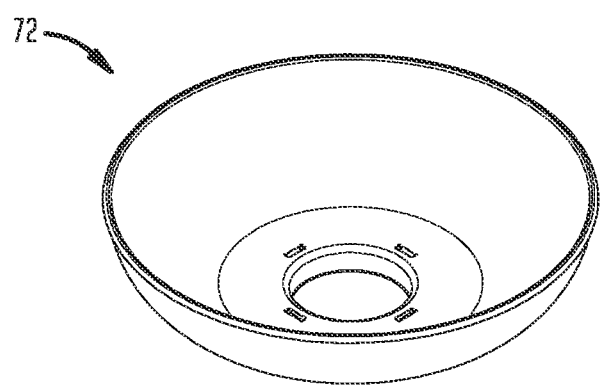
Figure 11B:
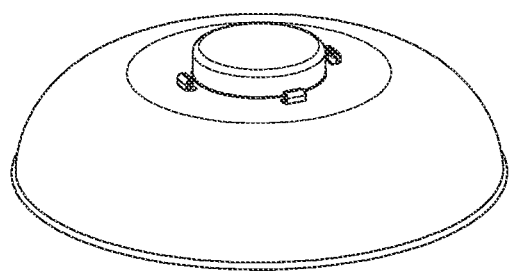

FIGS. 4A-4C illustrate a square grid framework 52 which can be formed with hubs 54 which only have four pockets or slots 54. Details of a four pocket hub 54 are shown in FIGS. 5A-5F. It is similar in construction to the six pocket hub 12 except that it has only four pockets 44 evenly spaced 90 degrees apart.

FIGS. 6A and 6B illustrates the manner in which the spoke ends 22 slides into slots 32 then engage the retention spring 34 in the pockets 44 of a four pocket hub 52. As shown in FIGS. 7A-7F each spoke end cap 22 includes a top, head section 56, a pin-like portion 58 and a concave detent 60 for selectively engaging the bump 42 on the retention spring 34. A spoke receiving pocket 62 is located in the head 56 of the spoke end cap 22. Downward pressure on the end cap head 56, as seen in FIG. 6A, forces the pin section 58 into the pocket 32 until the pin 58 is completely inserted into the pocket 32 and is held in that position by the engagement of convex bump 42 with concave detent 60. Disassembly is accomplished by pulling up on the spoke cap head 56 until the force is sufficient to case the bump 42 to disengage from the detent 60.

FIGS. 8A-8C illustrates how a decorative element support bowl is attached to a hub 54 and how the spokes 14 radiate from the hub 54. Also shown is a bowl 18 including a float chamber 64 located in the center of the bowl. The bowl 18 also locks the spoke ends 22 in position in pockets 32 of hubs 54. The basic frame including the hub 54 and spokes 14 are intended to remain just below the waterline and are not readily seen. The float chamber 64 located in the center of the bowl 18 and in conjunction with the buoyancy of the bowl 18 itself causes the apparatus to float in such a manner that only the bowl 18 is visible above the waterline.

FIGS. 9A-9C illustrate the hub 54 and spoke frame arrangement of FIGS. 8A-8C with the decorative bowl 18 replaced by a separate float element 65 visible above the hub. There are circumstances where it may be desirable not to have a decorative element support bowl 18 at a hub node but need to have the rest of the framework in place and in a balanced position just below the waterline. In this embodiment the float 65 alone locks the end caps 22 in position in pockets 32 of hub 54.

FIGS. 10A-10F illustrates details of a bowl subassembly 18 having a chamber 64 located in the center thereof and also illustrates the location of four dogleg tabs 66 for engaging via rotating motion the circumferential flat flange portions 48 of the four spoke hub 54.

FIGS. 11A-11E illustrates another embodiment of the decorative bowl 72 in which the bottom of the float is formed by the bottom of the bowl 18.

FIGS. 12A-12F show different views of a float subassembly 65. Float 65 includes dogleg tabs 66 for engaging that flange portions 48 of the four spoke hub 54.

Figure 12A:
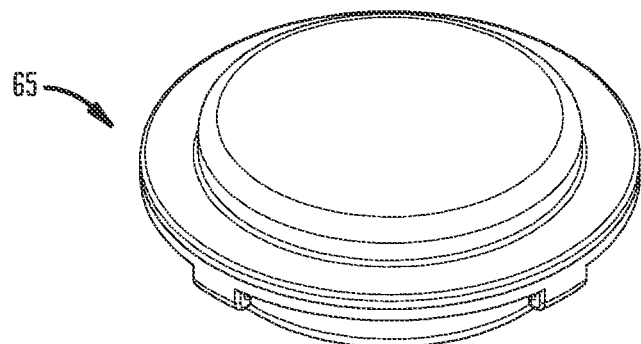
FIGS. 12A, 12B, 12C, 12D, 12E and 12F show different views of a float subassembly.
Figure 12B:
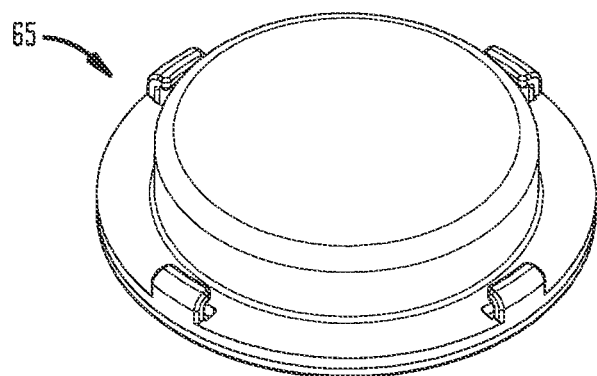
Figure 12C:
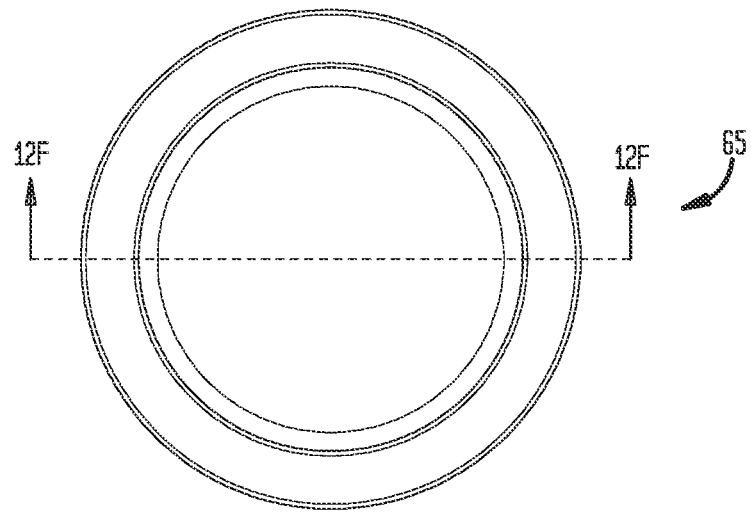
Figure 12D:
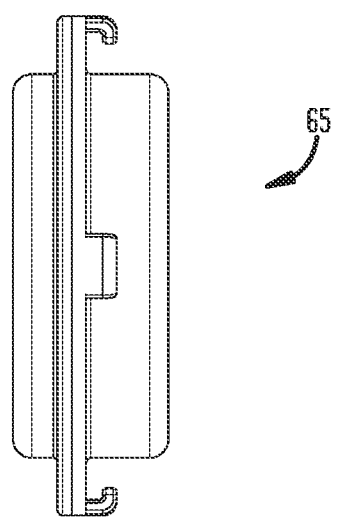
Figure 12E:
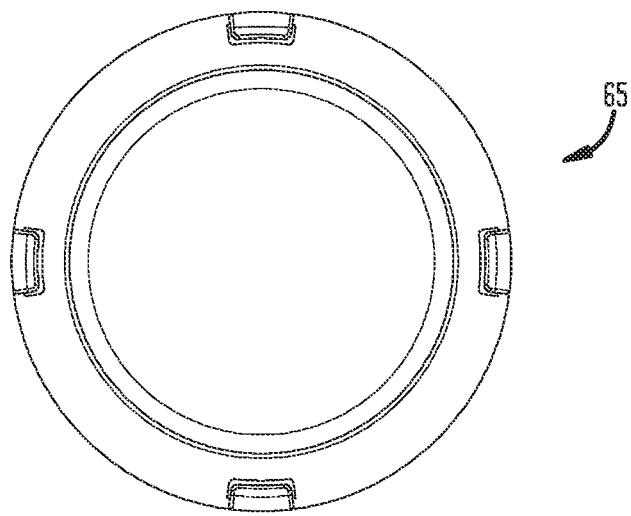
Figure 12F:
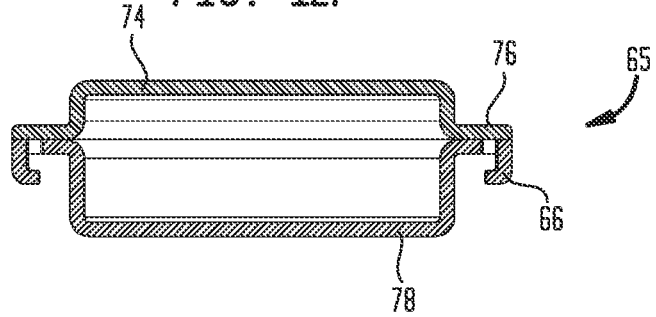
Figure 13A:
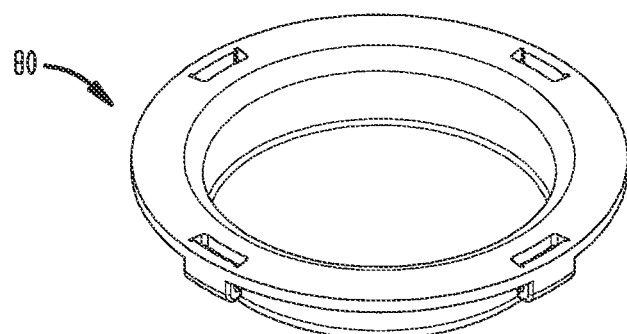
FIGS. 13A, 13B, 13C, 13D and 13E show different views of an float base.
Figure 13B:
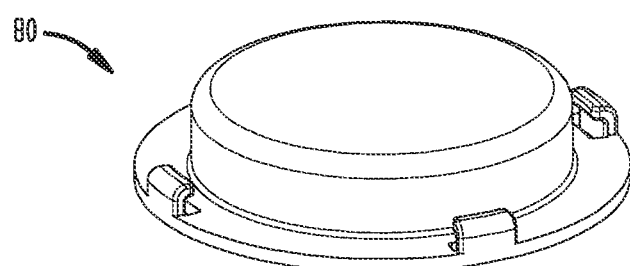
Figure 13C:
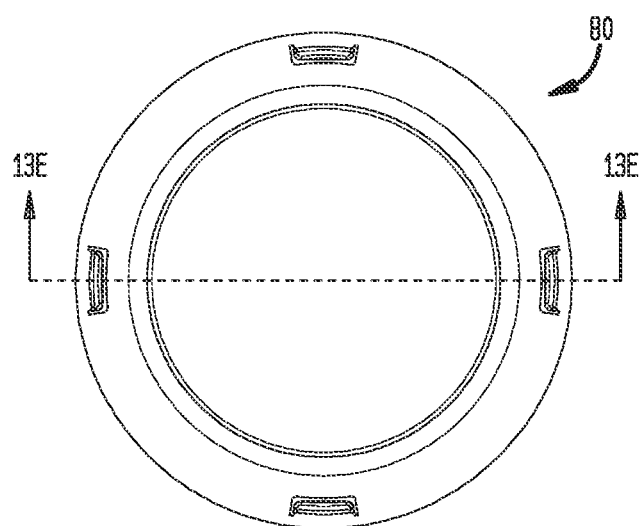
Figure 13D:
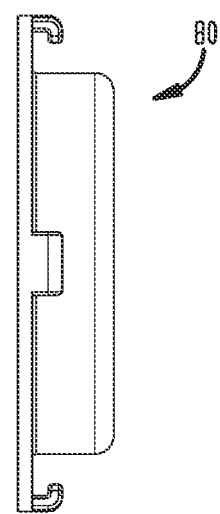
Figure 13E:
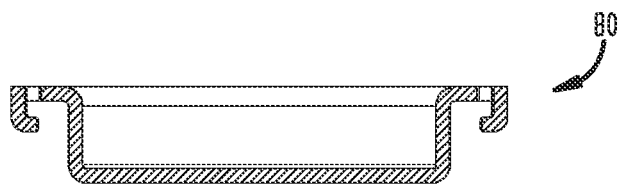
Figure 14A:
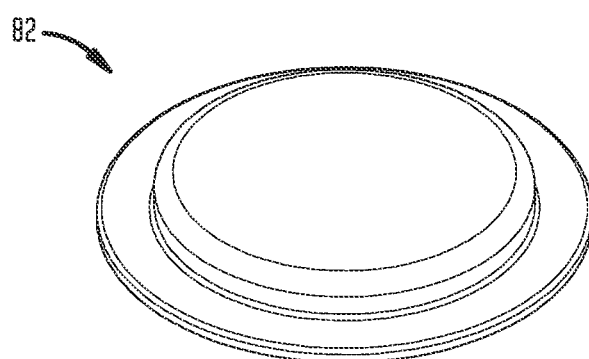
FIGS. 14A, 14B, 14C, 14D and 14E show different views of a float top.
Figure 14B:
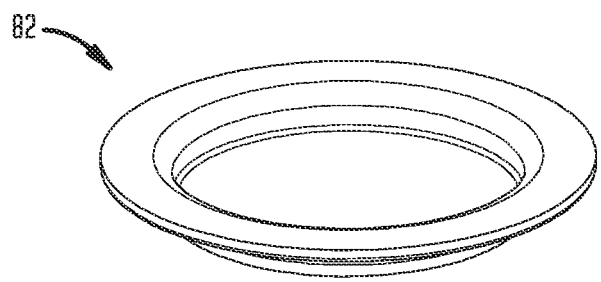
Figure 14C:
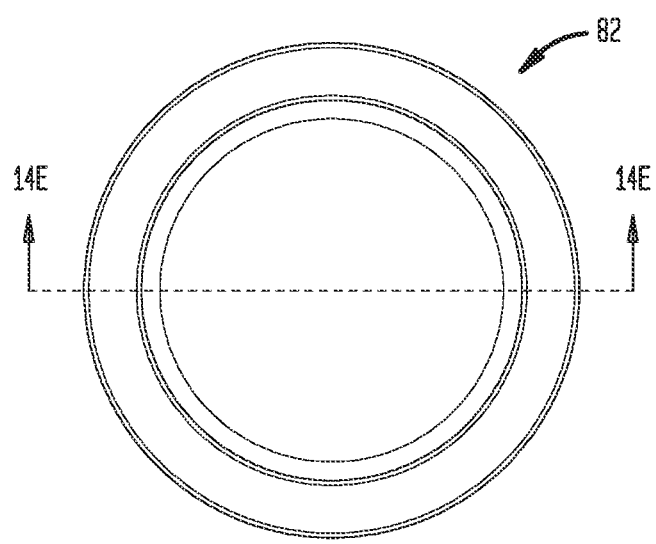
Figure 14D:
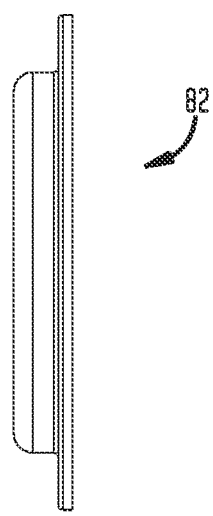
Figure 14E:
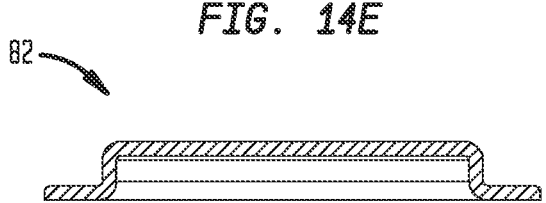
Figure 17A:
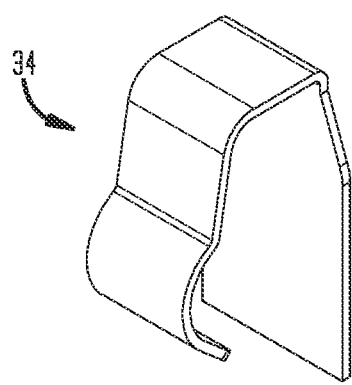
FIGS. 17A, 17B, 17C, 17D and 17E illustrate the U-shaped retention leaf spring including the convex bump which is received in each of the hub pockets and which hold the end caps of the spokes in position.
Figure 17B:
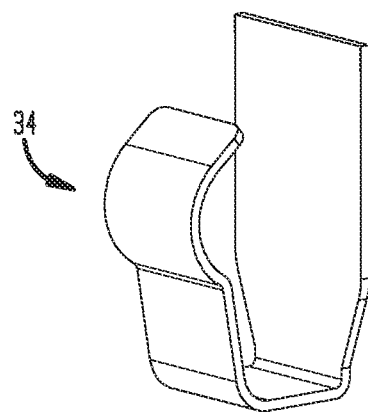
Figure 17C:
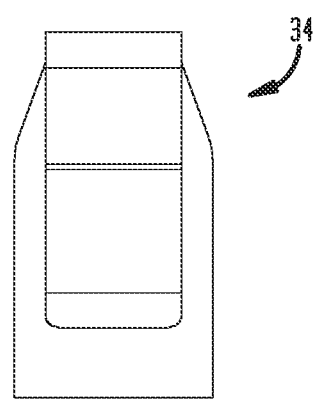
Figure 17D:
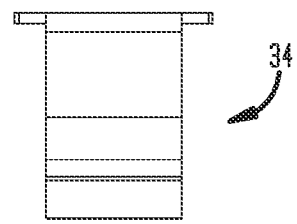
Figure 17E:
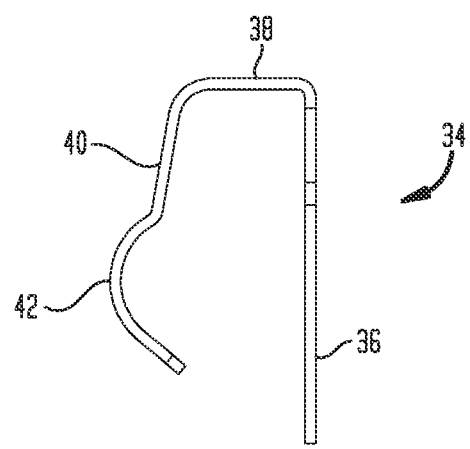
Figure 18B:
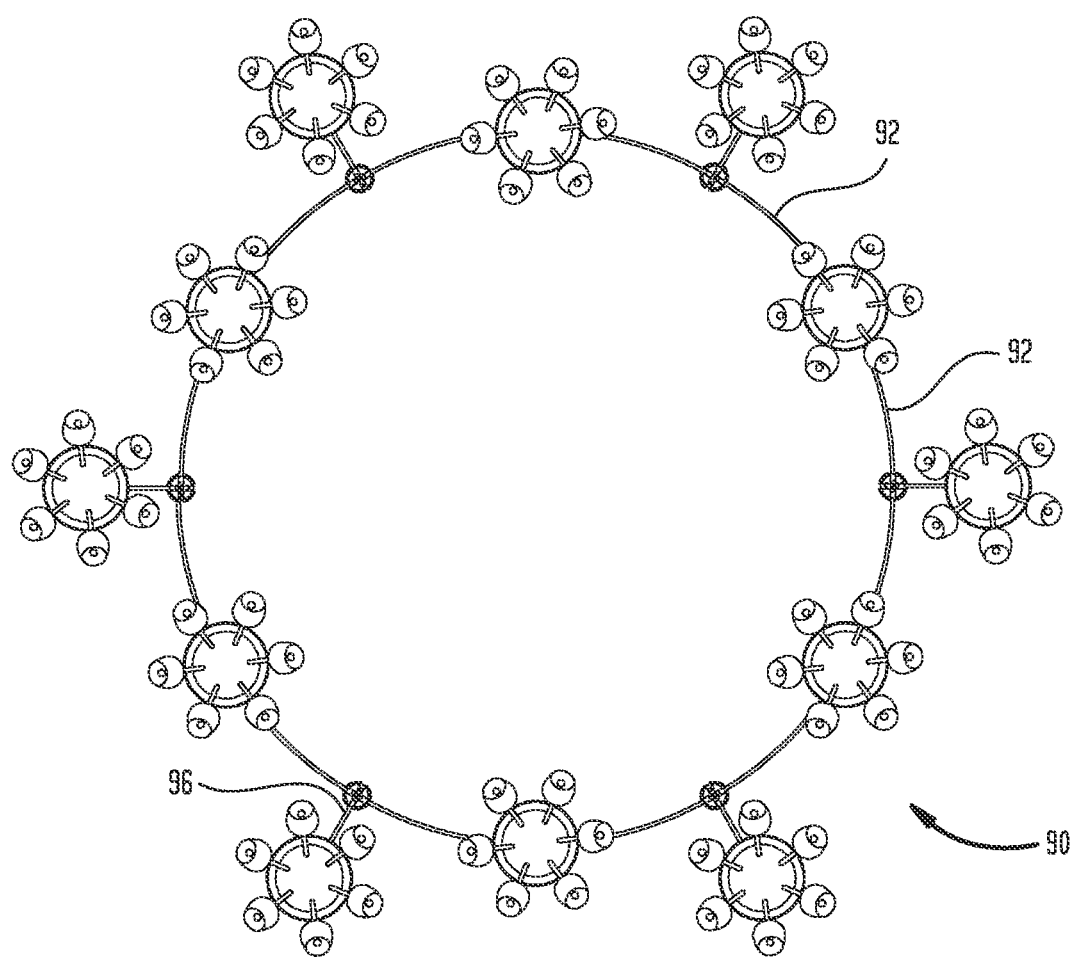
Figure 18C:
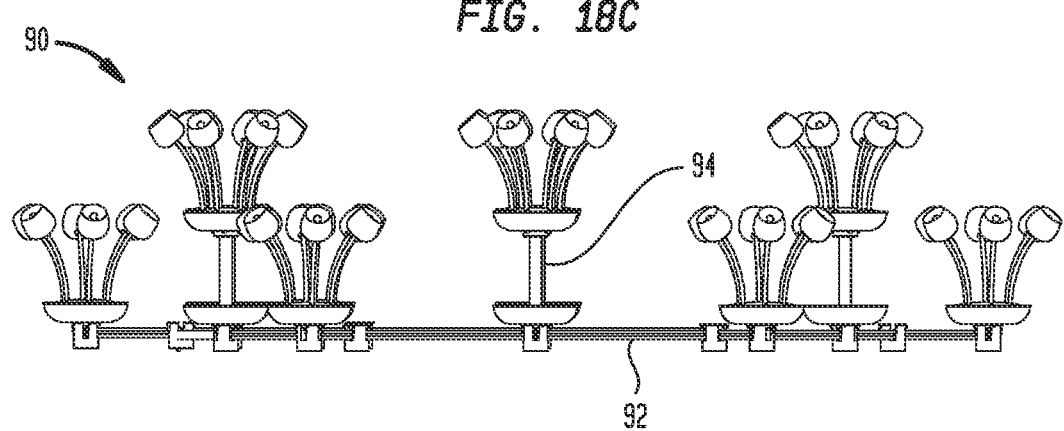
Figure 21A:
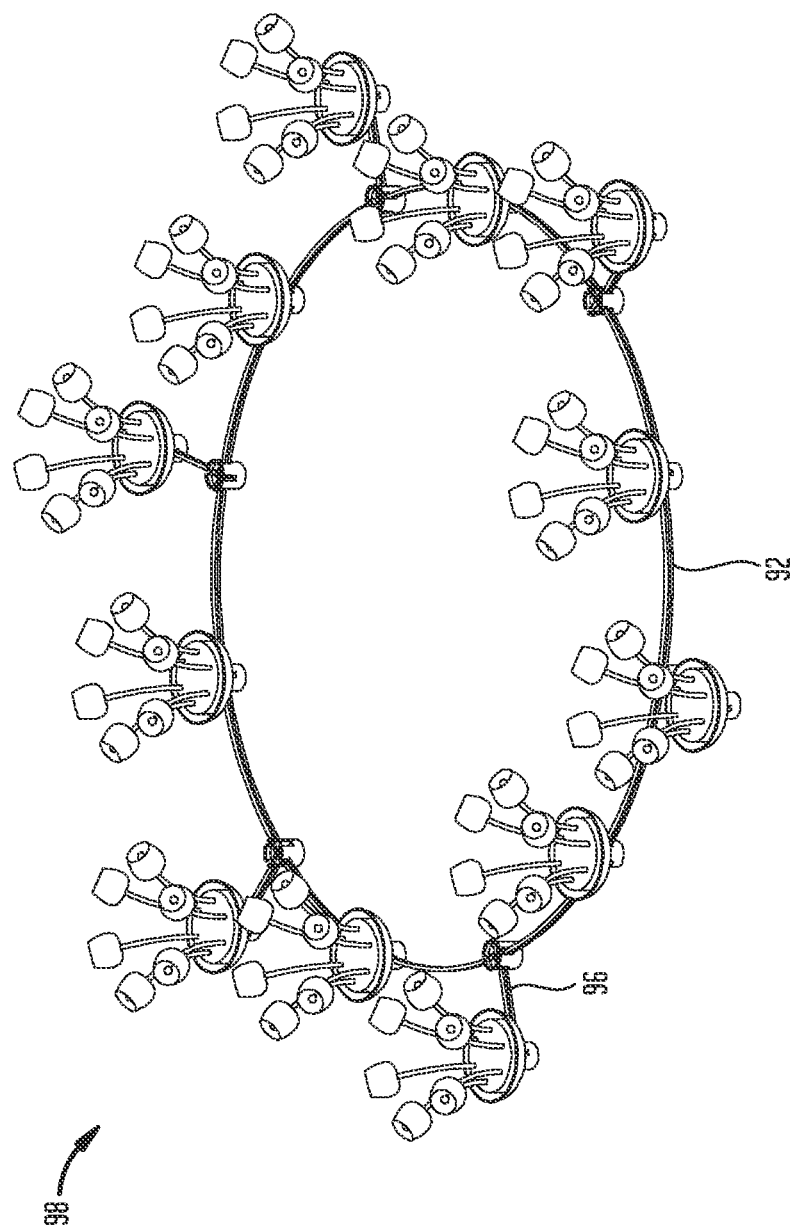
FIGS. 21A, 21B and 21C illustrate an alternative framework employing only horizontal extenders so that all decorative elements live essentially in the same horizontal plane.
Figure 21B:
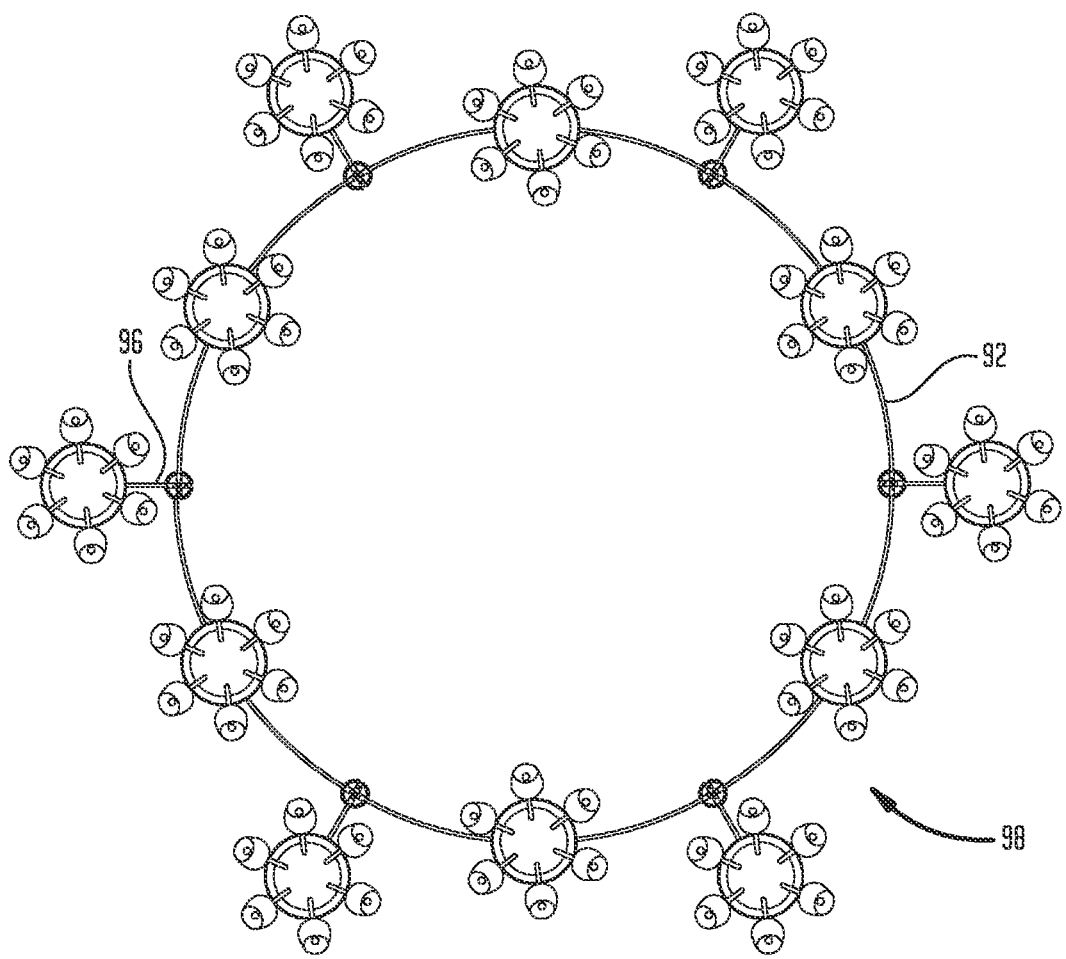
Figure 21C:
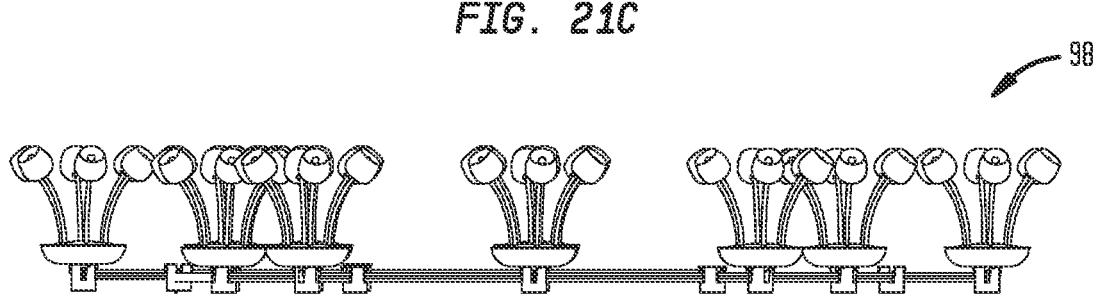

FIGS. 13A-13E illustrates the base 80 of a float and FIGS. 14A-14E illustrate the top 82 which mates with base 80 to form float 65 shown in FIG. 12F. The top 82 of the independent, standalone float 65 is also the same as the top 82 of the float chamber 64 in bowl 18 and can be welded or bonded by conventional means to base 80 or the bottom of bowl 18. The seal or bond is hermetic so the bowl 18 does sink or fill with water from below.

It is clear from the above that the float can either be stand alone and separate as in embodiment 65 or can be integrated into the structure of the bowl 18 itself where the bottom 64 of the bowl 72 forms the bottom of the integrated float as seen in FIGS. 11A-11E.

A typical straight spoke 14 is shown in FIGS. 15A-15C. Spoke 14 has an hour glass-like shape and includes a top rib 84, and intermediate connecting section 86 and a bottom rib 88. The shape is the inverse of the shape of the opening 62 in the end cap 22 so that the two mate and stay mated due to the force of friction or by means of thermal or adhesive bonding.

FIGS. 16A-16E show a typical spoke 14 with a pair of end caps 22 attached.

As previously described, FIGS. 17A-17E illustrate the U-shaped locking leaf-type retention spring 34 including the convex bump 42 which is received in the hub pockets 44 and hold the end caps 22 of the spokes 14 in properly assembled position.

FIGS. 18A-18C and 21A-21C illustrate a ring embodiment in which vertical extenders 94 can be used to raise the height of the decorative bowl 18 substantially above the height of the water surface. Horizontal extenders 96 can also be used to extend the framework in a plane horizontal to the water surface and the plane of the rest of the framework. Curved spokes 92 are used to connect the hubs 54 together to form a relatively smooth ring-like structure. FIGS. 19A-19D illustrate the alternative embodiment in which the spokes 92 are curved and FIGS. 20A-20D illustrate the manner in which the curved spoke 92 of FIGS. 19A-19D engages a four pocket hub 54.

The embodiments typically can be used in the following manner. First, the user determines the size and shape of the framework array and the number and type of decorative items based on the size and shape of body of water and the specific objectives of the display. Second, using the kit of components, the grid is assembled next to the body of water by snapping the spokes 14 into the hubs 12 or hubs 54. Third, the spokes 14 are than locked into place using either a standalone float subassembly 65 or a bowl 18. Fourth, the decorative elements 16 are attached to or contained in the bowls 18. Additional bowls 18 can be attached to the spokes 14 in between hubs 12 if required. As the array is assembled, it can be slid into the water. The array can also be assembled in the water.

If required, additional spokes 14 can be added on the outside of the array in order to locate the decorative elements 16 in bowls 18 away from the edge of the pool or fountain. In an open body of water, anchors can be attached to the array in order to keep it in place.

When no longer in use the decorative array 10, 20, 52, 90 and 98 can easily be removed from the water and disassembled for storage and future use.

The floating grid arrangements disclosed herein have advantages over the prior art, such as but not limited to:

A. The grid is formed using plastic materials with a specific gravity greater than 1.0. These materials can be transparent or colored to match the bottom of the pool.

B. The spokes 14 can be formed in various lengths in order to provide maximum flexibility in the configuration of the array. The spokes have end fittings or caps 22 that are permanently attached. These caps 22 enable quick attachment to the hubs 12, 54 in such a way as to stabilize the grid framework during assembly.

C. The spokes 14 snap into the hubs 12, 54 from above and are retained by spring clips 34 pre-assembled into the hubs 12, 54. The spokes 14 are further locked into position when the float subassembly 65 or a bowl 18 is locked into place on the top of the hub 12. The bowls 18 will hold the decorative elements 16 and the floats 65 can be locked into place on top of the hubs 12, 54 where no bowls are required.

D. It is possible to attach bowls 18, with decorative items 16 in them, to the spokes 14 in between the connecting hubs 12.

E. The floats 65 and the bowls 18 provide the buoyancy to keep the grid from sinking too far below the surface of the water.

F. The size and configuration of the grid is quite variable according to the number of hubs 12, 54 and lengths of spokes 14 and 92.

G. Hubs 12 with six (6) evenly spaced slots 32 will produce a hexagonal array. Hubs 54 with four (4) evenly spaced slots 32 to hold spokes 12 will produce a rectangular array.

H. Curved spokes 92 will produce a circular array. The radius of curvature will define the overall size of this array.

I. Vertical extension fittings 94 can be attached to bowls 18 to provide a platform for decorative arrangements at various heights above the surface of the water.

J. Once the array is constructed with the spokes 14, 92 locked into place in the hubs 12, 54 the whole grid can be maneuvered easily. This allows for construction of the grid on land and so it can to be easily slid into the water for final positioning.

K. If required the grid can be easily modified once it has been deployed in the water.

L. The locking mechanism that keeps the elements of the array in place is unique and easy to use. In the case of a bowl 18 and hub 54, the lower protruding portion 64 acts as a pilot to guide into the slotted cylindrical opening 30 after the spoke caps have been inserted into pockets 32 and held in place by springs 34. Once the base of float 64 of bowl 18 is fully seated, the bowl is rotated about 60° so that the dog legged tabs 66 engage the underside of top flange 48 and are held in place by friction and/or the natural springiness of the plastic compartments. Additional security can be obtained by adding a small rib or bump (not shown) to the underside of flange 48 so the tabs 66 don't back out. The locking with a standalone float 65 is accomplished in exactly the same way, namely, the base 80 is inserted in the slotted cylindrical opening 30 and then rotated until the dog legged tabs 66 fully engage the underside of the top flange 48.

FIGS. 22-37 depict an alternative embodiment in the form of a floating apparatus 98 for supporting decorative elements in water, with an alternative arrangement for retaining the spokes and the bowl. The floating apparatus 98 includes a hub 100; a decorative element support bowl 102; four spoke end fittings 104; a bowl adapter 106; and a float 108. The floating apparatus 98 is configured to be connected to four of the spokes 14. Alternative embodiments of the floating apparatus can be configured for connection to more, or less than four spokes 14.

The floating apparatus 98 is configured so that each spoke 14 can be connected to the hub 100 via a single spoke end fitting 104, without the need for a separate, additional piece such as the above-described spoke retention spring clip 34.

Figure 23:
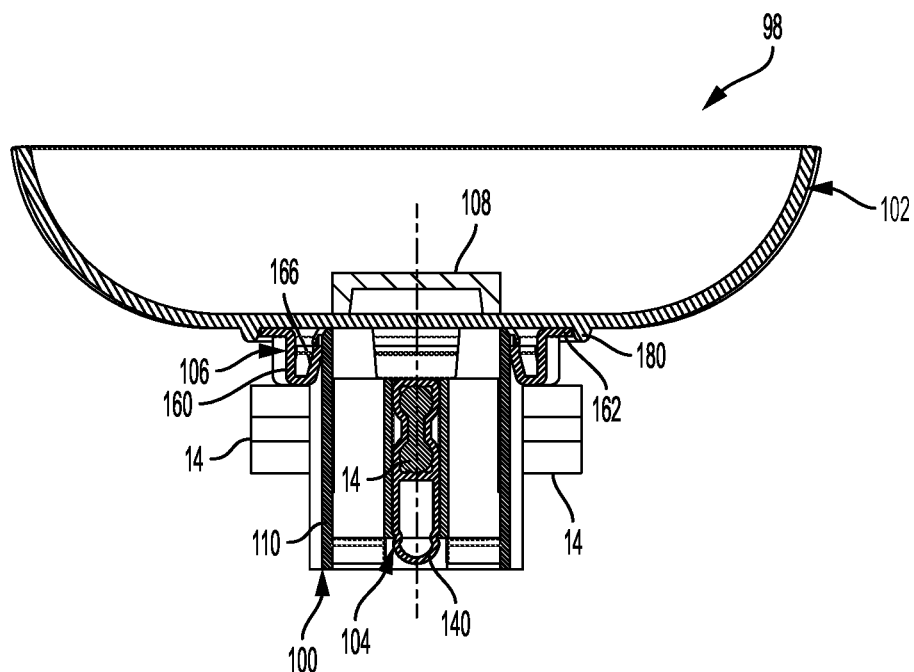
FIG. 23 is cross-sectional view of the floating apparatus and spokes shown in FIG. 22, taken along the line "A-A" of FIG. 24.
Figure 24:
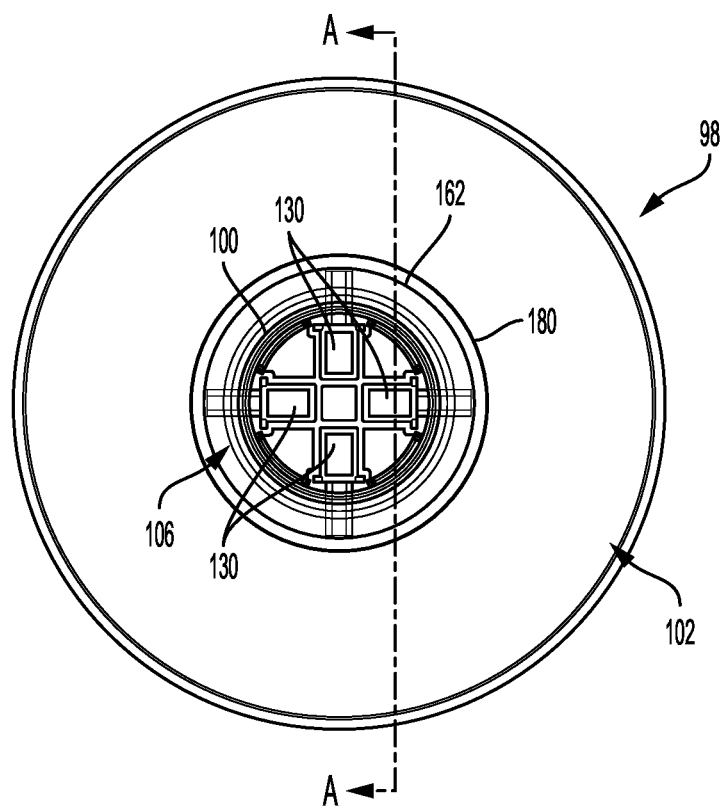
FIG. 24 is top view of the floating apparatus and spokes shown in FIGS. 22 and 23, in the assembled state.
Figure 25:
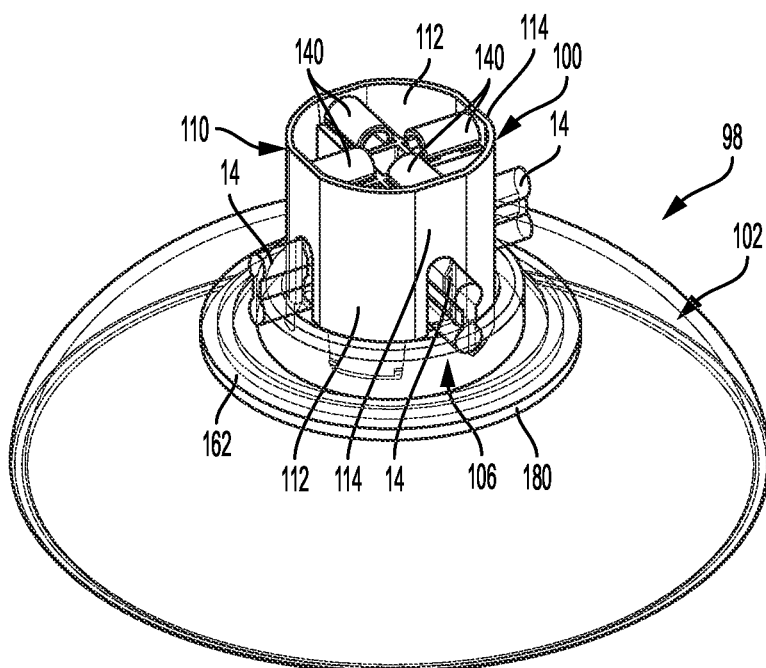
FIG. 25 is bottom perspective view of the floating apparatus and spokes shown in FIGS. 22-24, in the assembled state, and depicting the spokes as semi-transparent.

The hub 100, bowl 102, spoke end fittings 104, bowl adapter 106, and float 108 can be formed from a thermoplastic or thermosetting material; other types of materials can be used in the alternative. The float 108 can be a float chamber mounted in the center of the bowl 102, as depicted in FIG. 23 (for clarity of illustration, the float 108 is depicted in FIG. 23 only). Alternatively, the float 108 can be formed by the bottom of the bowl 102.

Figure 22:
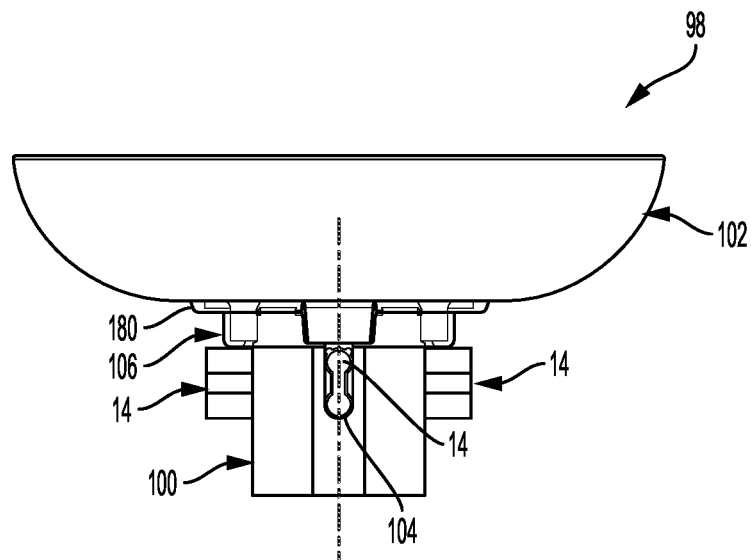
FIG. 22 is a side view of an alternative embodiment of a floating apparatus for supporting decorative elements in water, showing a decorative element support bowl, spoke end fittings, a hub, and a bowl adapter of the floating apparatus in an assembled state, and showing end portions of spokes connected to the spoke end fittings.

References to directional terms such as "above," "below," "upper," "lower," etc. are made in reference to the component orientations depicted in FIG. 22. These terms are used for illustrative purposes only, and unless otherwise noted, are not intended to limit the scope of the appended claims.

Figure 26:
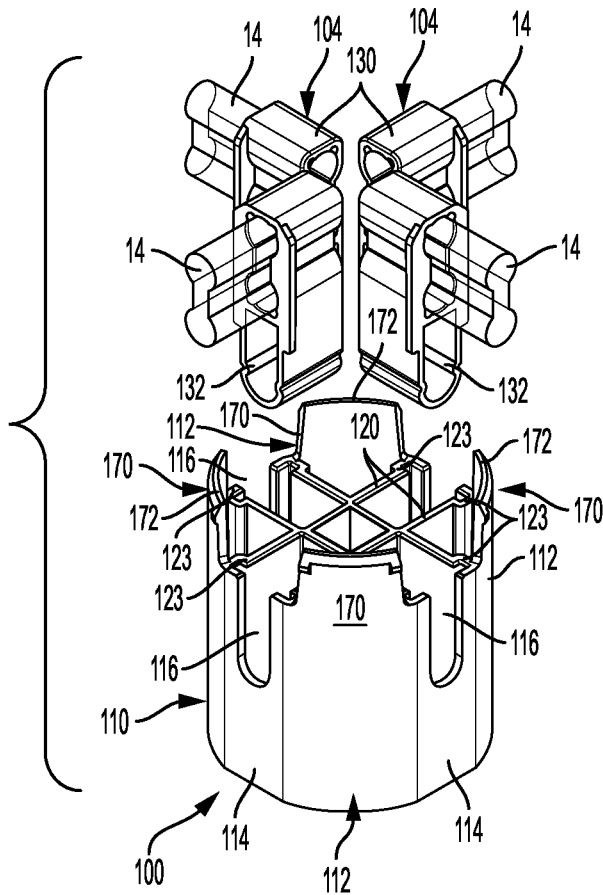
FIG. 26 is a partially exploded, top perspective view of the hub and spoke end fittings of the floating apparatus, and the spokes shown in FIGS. 22-25, depicting the spokes as semi-transparent.
Figure 27:
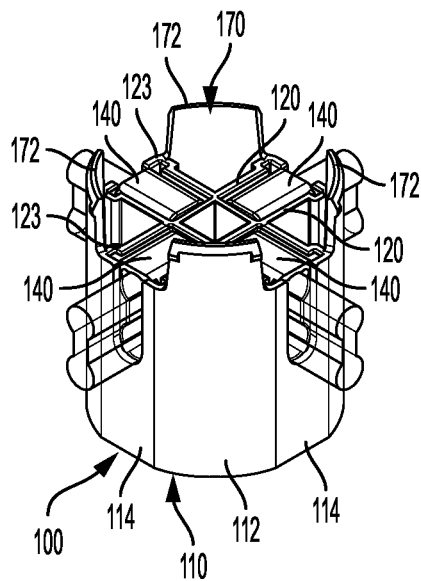
FIG. 27 is a top perspective view of the hub, spoke end fittings, and spokes shown in FIGS. 22-26, in the assembled state, and depicting the spokes as semi-transparent.

As can be seen in FIGS. 26 and 27, the hub 100 includes an outer wall 110 having four rounded corner portions 112, and four planar portions 114. Each planar portion 114 is disposed between, and adjoins an associated two of the corner portions 112, so that each planar portion 114 is oriented at an angle of about 90 degrees in relation to its adjacent planar portions 114. The planar portions 114 each have a slot 116 formed therein. The slot 116 extends downward, from an upper edge of the planar portion 114.

Figure 29:
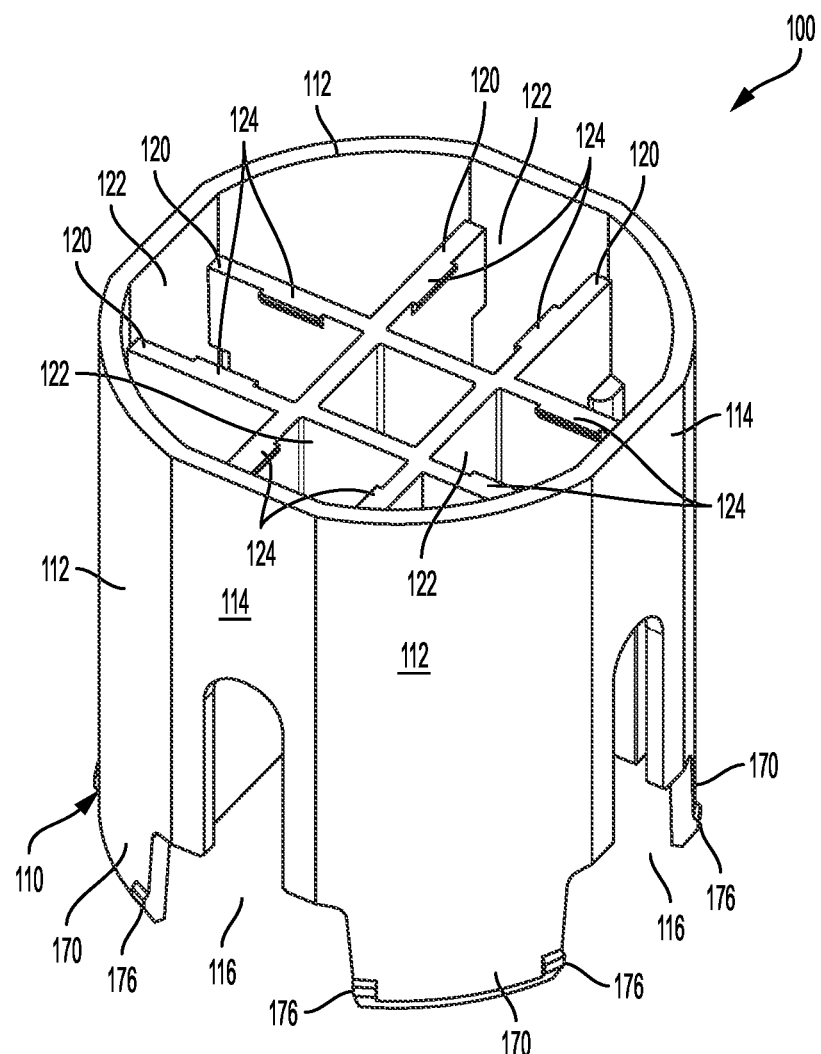
FIG. 29 is a bottom perspective view of the hub shown in FIGS. 22-28A.

The hub 100 also has a plurality of interior walls 120, as shown in FIGS. 26, 27, and 29. An end of each interior wall 120 adjoins an associated planar portion 114 of the outer wall 110. The interior walls 120 and the planar portions 114 define pockets 122. Each pocket 122 receives an associated one of the spoke end fittings 104.

Referring to FIGS. 26 and 27, the interior walls 120 and the planar portions 114 of the hub 100 define slots 123. Each slot 123 extends downward from the upper edge of its associated interior wall 120. The slots 123 have a height, or vertical dimension, that is less than the overall height of the interior walls 120. Two of the slots 123 are associated with each pocket 122. The two slots 123 associated with each pocket 122 adjoin, and are disposed on opposite sides of the pocket 122.

Each interior wall 120 includes a plurality of tabs 124 disposed along the bottom edge of interior wall 120, as can be seen in FIG. 29. The tabs 124 are configured so that two of the tabs 124 are associated with, and are located on opposite sides of each pocket 122.

Figure 30:
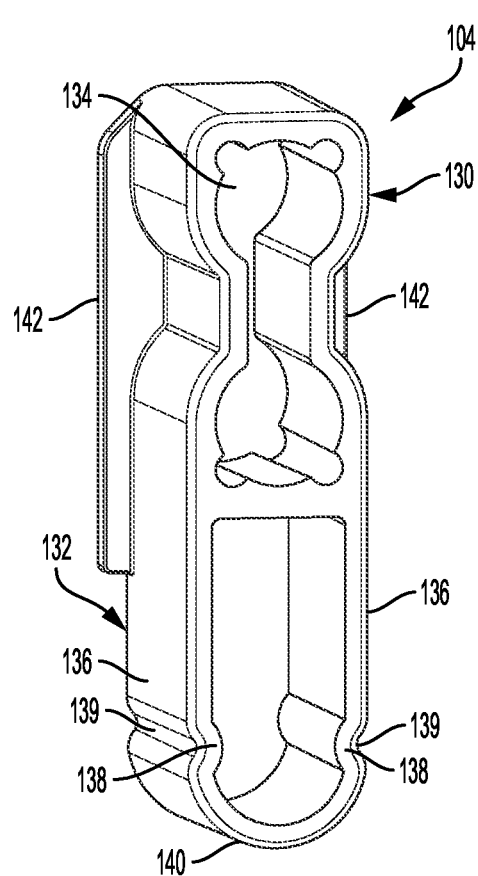
FIG. 30 is a front perspective view of one of the spoke end fittings shown in FIGS. 22-27.
Figure 31:
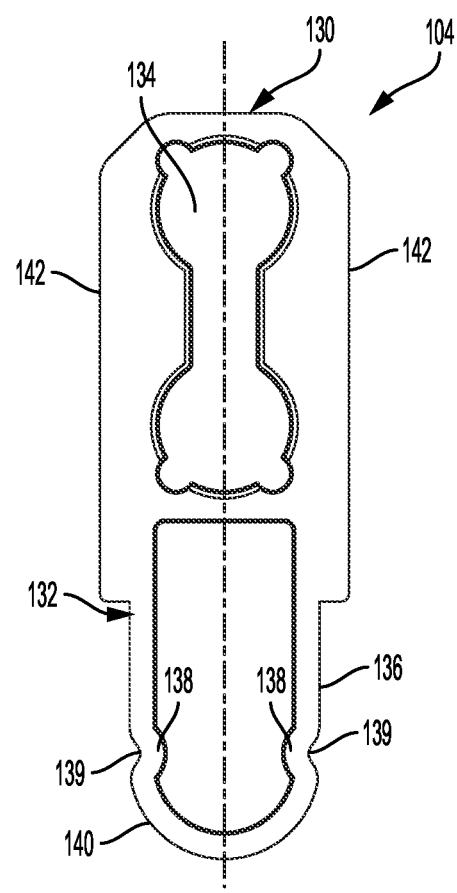
FIG. 31 is a front view of the spoke end fitting shown in FIGS. 22-27 and 30.
Figure 32:
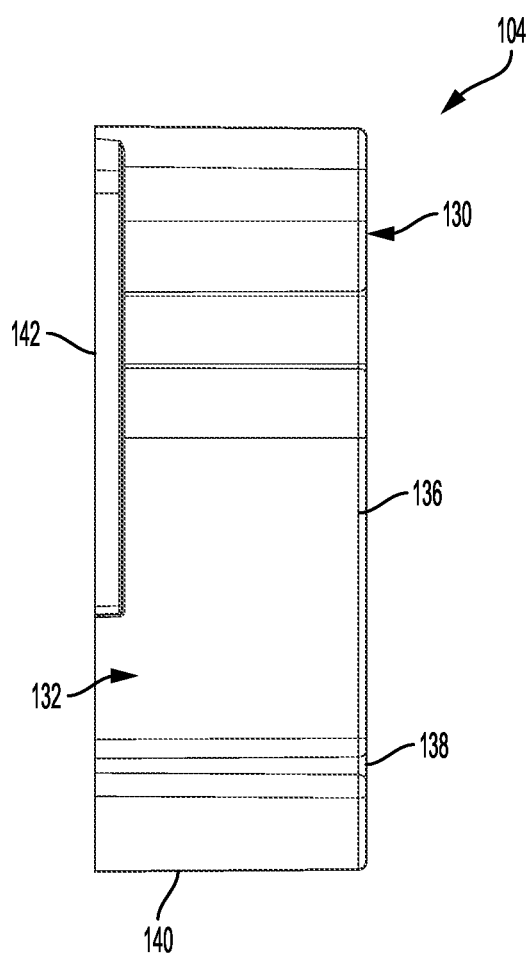
FIG. 32 is a side view of the spoke end fitting shown in FIGS. 22-27, 30, and 31.

Referring to FIGS. 30-32, each spoke end fitting 104 includes an upper portion 130 and an adjoining lower portion 132. The upper portion 130 has an opening 134 formed therein. The opening 134 is configured to receive the spoke 14. The opening 134 has a shape that substantially matches the cross-sectional shape of the spoke 14; and the opening 134 is sized so that the spoke 14, once inserted in the opening 134, is retained in the opening 134 by an interference fit between the spoke 14 and the upper portion 130.

The lower portion 132 of the spoke end fitting 104 includes two sidewalls 136; two indented portions 138; and an end portion 140. An upper end of each sidewall 136 adjoins the upper portion 130 of the spoke end fitting 104; and a lower end of each sidewall 136 adjoins a respective one of the indented portions 138. The end portion 140 is curved. Each end of the end portion 140 adjoins a respective one of the indented portions 138. As can be seen in FIGS. 30 and 31, each indented portion 138 is curved inwardly, so that the indented portion forms a depression 139.

Each spoke end fitting 104 also includes two web portions 142, as can be seen in FIGS. 30-32. The web portions 142 adjoin, and extend outwardly from opposite sides of the upper and lower portions 130, 132 of the spoke end fitting 104. The web portions 142 are configured to be received by the slots 123 when the spoke end fitting 104 is inserted into its associated pocket 122. The web portions 142 have a height, or vertical dimension, that is approximately equal to the height of the slots 123.

Figure 33:
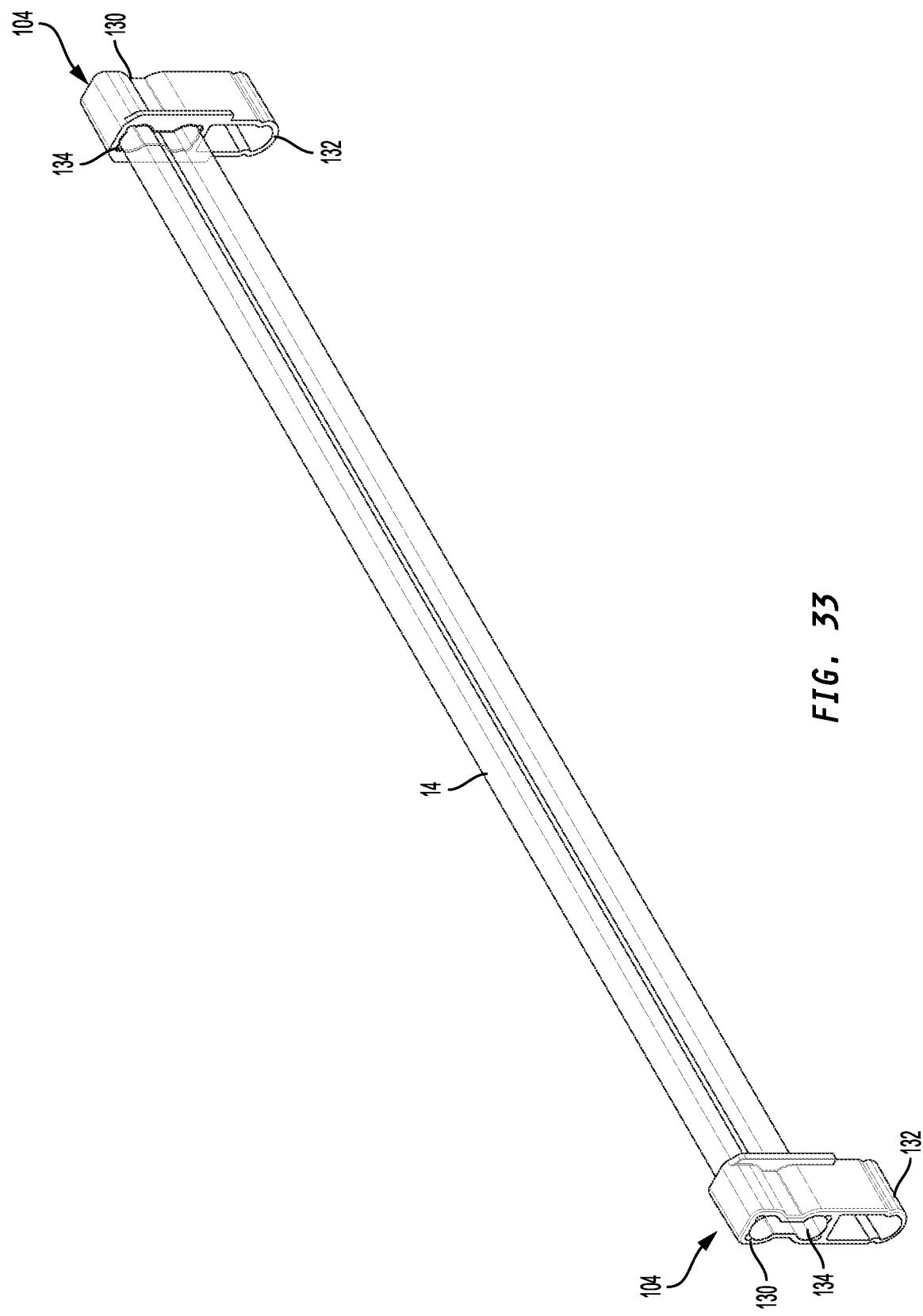
FIG. 33 is a top perspective view of two of the spoke end fittings shown in FIGS. 22-27 and 30-32, connected to a spoke, with the spoke being depicted as semi-transparent.

Each spoke 14 is connected to its associated hub 100 by a spoke end fitting 104. The spoke end fitting 104 is connected to the spoke 14 by inserting an end of the spoke 14 into the opening 134 in the upper portion 130 of the spoke end fitting 104, as can be seen in FIG. 33. The spoke end fitting 104 and the spoke 14 then can be connected to the hub 100 by aligning the end portion 140 of the spoke end fitting 104 with one of the pockets 122 in the hub 100, and moving spoke end fitting 104 toward the pocket 122.

The movement of the spoke end fitting 104 toward the hub 100 initially causes the end portion 140 of the spoke end fitting 104 to become disposed in the pocket 122. Continued movement of the spoke end fitting 104 causes the lower portion 132 of the spoke end fitting 104 to enter the pocket 122, and the web portions 142 to enter their associated slots 123 in the hub 100. Further movement of the spoke end fitting 104 toward the hub 100 causes the upper portion 130 of the spoke end fitting 104 to become disposed in the pocket 122. As can be seen in FIG. 27, the slot 116 formed in the adjacent planar portion 114 of the hub 100 accommodates the spoke 14 as the upper portion 130 enters the pocket 122.

The end portion 140 of the spoke end fitting 104 contacts the tabs 124 on the hub 100 as the spoke end fitting 104 approaches its fully-inserted position within the pocket 122. The curvilinear shape of the end portion 140, in conjunction with the resilience of end portion 140 and the sidewalls 136, cause the end portion 140 and the sidewalls 136 to flex inwardly as the end portion 140 passes over, and is urged inwardly, by the tabs 124. Once the end portion 140 has passed the tabs 124, the end portion 140 and the sidewalls 136 return, or spring back, to their un-deflected states. This movement causes the tabs 124 to become disposed within the depressions 139 defined by the adjacent indented portions 138 of the spoke end fitting 104.

At this point the web portions 142 have reached the extent of their downward travel in their respective slots 123; and interference between the lower ends of the web portions 142 and the bottom surface of the associated slots 123 prevents further downward movement of the spoke end fitting 104 and the attached spoke 14.

The spoke end fitting 104 is held in the pocket 122 by interference between the tabs 124 and the adjacent surfaces of the indented portions 138, which discourages upward movement of the spoke end fitting 104 in the pocket 122.

The spoke end fitting 104 can be removed from the pocket 122 by pulling upwardly on the spoke 14, or by pushing upwardly on the end portion 140 from beneath the hub 100, to exert an upwardly-directed force on the spoke end fitting 104. The upwardly-directed force causes the tabs 124 to urge the indented portions 138 inwardly, until the indented portions 138 clear the tabs 124. At this point, the spoke end fitting 104 is free to move upwardly, out of the pocket 122, in response to the upwardly-directed force on the spoke end fitting 104.

Figure 34:
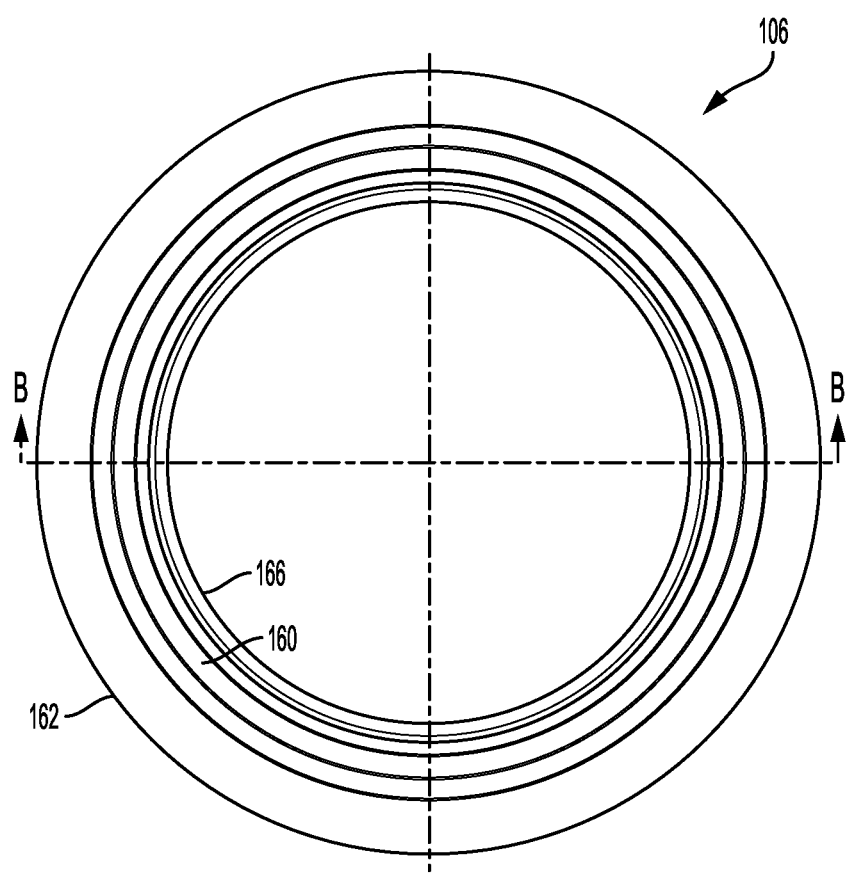
FIG. 34 is a top view of the bowl adapter of the floating apparatus shown in FIGS. 22-25.
Figure 35:
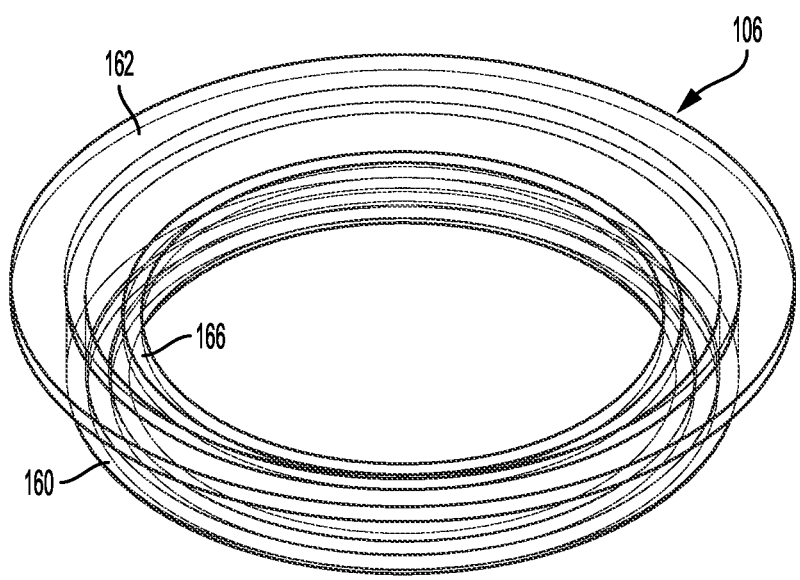
FIG. 35 is a top perspective view of the bowl adapter shown in FIGS. 22-24 and 34.
Figure 36:
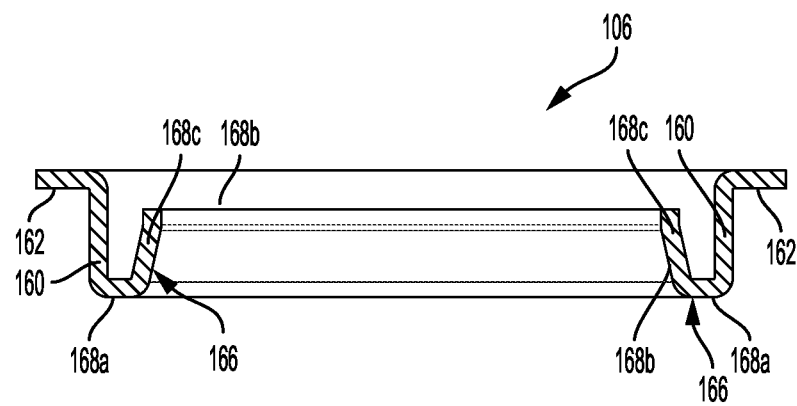
FIG. 36 is a cross-sectional, semi-transparent view of the bowl adapter shown in FIGS. 22-24, 34, and 35, taken through the line "B-B" of FIG. 34.
Figure 37:
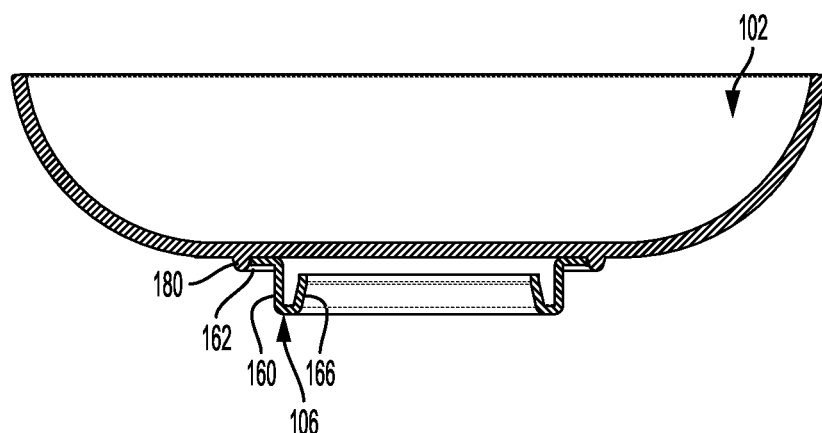
FIG. 37 is a cross-sectional view of the bowl and bowl adapter shown in FIGS. 22-24 and 34-36, taken though the lines "A-A" of FIG. 24 and "B-B" of FIG. 34.

The bowl 102 is mounted on the hub 100 by way of the bowl adapter 106. The bowl adapter 106 is ring-shaped, as can be seen in FIGS. 34 and 35. The bowl adapter 106 has a sidewall 160 and a first, or upper lip 162. The upper lip 162 adjoins the upper end of the sidewall 160, and extends outwardly from the sidewall 160 at an angle of about 90 degrees in relation to the sidewall 160, as illustrated in FIGS. 36 and 37.

The bowl adapter 106 also includes a second, or inner lip 166. The inner lip 166 has a first portion 168a that adjoins the lower end of the sidewall 160, and extends inwardly from the sidewall 160 at an angle of about 90 degrees in relation to the sidewall 160. The inner lip 166 also includes a second portion 168*b* that adjoins the first portion 168*a*, and extends upwardly and inwardly from the first portion 168*a*, at an angle of about 12.5 degrees in relation to the vertical direction. The second portion 168*b* can have other orientations in alternative embodiments. The inner lip 166 also includes a third portion 168*c* that adjoins the second portion 168*b*, and extends upwardly from the second 168*b*.

Figure 28:
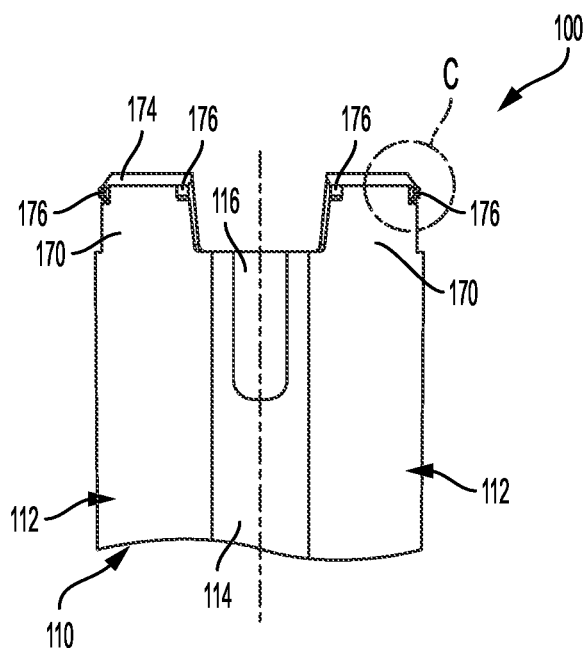
FIG. 28 is a side view of the hub shown in FIGS. 22-27.
Figure 28A:
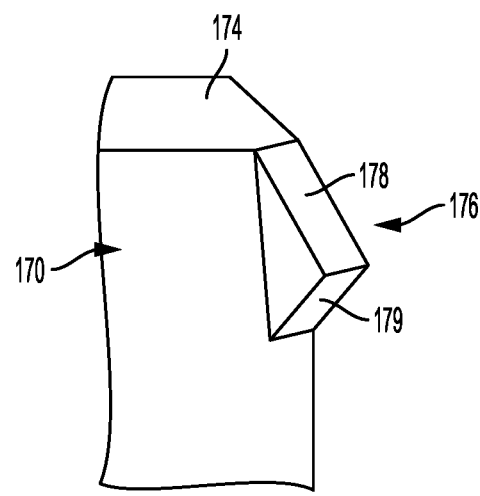
FIG. 28A is a magnified view of the area designated "C" in FIG. 28.

Referring to FIGS. 26-29, each corner portion 112 has a finger, or upper segment 170. The upper segment 170 forms the uppermost portion of the corner portion 112, and has a smaller width, or side-to-side dimension, than the remainder of the corner portion 112. Each upper segment 170 has an upper surface 172; and an angled surface 174 that adjoins, and extends outwardly and downwardly from the upper surface 172. Each upper segment 170 also includes two outwardly-facing tabs 176. The tabs 176 on each upper segment 172 are located below the angled surface 174, on opposite ends of the upper segment 172. As can be seen in FIG. 28A, each tab 176 has an upwardly-angled surface 178 that adjoins the angled surface 174; and a downwardly-angled surface 179.

Referring to FIGS. 22-25 and 37, the bowl 102 has a ring-shaped projection 180 extending from a bottom surface 182 thereof. The bowl adapter 106 is retained on the bowl 102 by an interference fit between the projection 180 and the bowl adapter 106. In particular, the projection 180 is positioned and dimensioned so that the inwardly-facing surface of the projection 180 contacts the outwardly-facing surface of the upper lip 162 of the bowl adapter 106; and the resulting friction between the projection 180 and the upper lip 162 inhibits separation of the bowl adapter 106 from the bowl 102. The bowl adapter 106 can be retained on the bowl 102 by other means, such as adhesive or fasteners, in alternative embodiments.

The bowl 102 and the bowl adapter 106 can be installed on the hub 100 by aligning the center of the bowl 102 with the center of the hub 100, and moving the bowl 102 toward the hub 100 so that the angled surface 174 of each corner portion 112 of the hub 100, and the upwardly-angled surfaces 178 of the tabs 176 contact the second portion 168*b* of the inner lip 166 of the bowl adapter 106. Due to the resilience of the hub 100 and the bowl adapter 106, and the angled orientations of the surfaces 174, 176, further movement of the bowl 102 toward the hub 100 causes the inner lip 166 of the bowl adapter 106 to deflect outwardly, while the upper segments 170 of the hub 100 deflect inwardly.

Continued movement of bowl 102 toward the hub 100 eventually causes the tabs 176 to contact, and slide along the third portion 168*c* of the inner lip 166, until the tabs 176 move past the third portion 168*c*. At this point, the inner lip 166 and the upper segments 170 spring back, or return to their un-deflected positions. Once the inner lip 166 and the upper segments 170 have returned to their un-deflected positions, interference between the downwardly-angled surfaces 179 of the tabs 176, and the third portion 168*c* of the inner lip 166 discourages separation of the bowl 102 from the hub 100.

When desired, the bowl 102 can be separated from the hub 100 pulling the bowl 102 and the hub 100 away from each other. The resulting interaction between the downwardly-angled surfaces 179 of the tabs 176 and the third portion 168*c* of the inner lip 166 causes the inner lip 166 to deflect outwardly while the upper segments 170 of the hub 100 deflect inwardly, allowing the tabs 176 to slide downward along the second and third portions 168*b*, 168*c* of the inner lip 166, until the tabs 176 have cleared the inner lip 166. At this point, the bowl adapter 106 and the bowl 102 are separated from the hub 100. Thus, the bowl 102 can be mounted on and removed from the hub 100 with a simple push-on, pull-off motion, without a need for a twist-lock feature.

While inventive concepts have been described with reference to a preferred embodiment thereof and several alternative embodiments, it will be appreciated by those of ordinary skill in the art that various modifications can be made to the structure and form of the inventive concepts without departing from the spirit and scope of the inventive concepts as a whole.

We claim:

1. A floating apparatus for supporting decorative elements in water, the floating apparatus comprising:
   a hub comprising an outer wall, a plurality of interior walls attached to the outer wall, and a plurality of tabs, the outer wall and the interior walls defining a plurality of pockets;
   at least two spokes;
   a float configured to be attached to the hub;
   a decorative element support bowl configured to be attached to the hub; and
   at least two spoke end fittings, wherein: the pockets are configured to receive the spoke end fittings; each of the spoke end fittings has a first portion, and a second portion attached to the first portion; the first portion has an opening configured to receive a portion of one of the spokes; the second portion is configured to securely engage at least one of the interior walls of the hub when the spoke end fitting is positioned in one of the pockets; and the second portion is configured to securely engage at least a first of the tabs when the spoke end fitting is positioned in one of the pockets.

2. The floating apparatus of claim 1, wherein the second portion of the spoke end fitting is configured to resiliently deflect in response to contact with the first tab when the spoke end fitting is inserted into one of the pockets.

3. The floating apparatus of claim 2, wherein the second portion of the spoke end fitting comprises:
   a first and a second sidewall each attached to the first portion of the spoke end fitting;
   a first and a second indented portion attached respectively to the first and second sidewalls, the first and second indented portions being configured to engage the first and a second of the tabs, respectively, when the spoke end fitting is positioned in one of the pockets; and
   an end portion attached to the first and second indented portions.

4. The floating apparatus of claim 3, wherein the first and second indented portions each define a depression, and the first and second tabs are positioned in a respective one of the depressions when the spoke end fitting is positioned in one of the pockets.

5. The floating apparatus of claim 3, wherein the first and second sidewalls and the end portion are configured to flex as the end portion passes over the first and second tabs during insertion of spoke end fitting into one of the pockets.

6. The floating apparatus of claim 3, wherein the first and second sidewalls are substantially straight, and the end portion is curved.

7. A floating apparatus for supporting decorative elements in water, the floating apparatus comprising:
   a hub comprising an outer wall, and a plurality of interior walls attached to the outer wall, the outer wall and the interior walls defining a plurality of pockets;
   at least two spokes;
   a float configured to be attached to the hub;

a decorative element support bowl configured to be attached to the hub; and at least two spoke end fittings, wherein:

the pockets are configured to receive the spoke end fittings;

each of the spoke end fittings has a first portion, a second portion attached to the first portion, and a web attached to the first and second portions;

the first portion has an opening configured to receive a portion of one of the spokes;

the second portion is configured to securely engage at least one of the interior walls of the hub when the spoke end fitting is positioned in one of the pockets; and the outer wall and the interior walls of the hub define a plurality of slots configured to receive a respective one of the webs when the spoke end fitting is inserted in one of the pockets.

8. A floating apparatus for supporting decorative elements in water, the floating apparatus comprising:

a hub comprising: an outer wall; a plurality of interior walls attached to the outer wall, the outer wall and the interior walls defining a plurality of pockets; and a plurality of tabs;

at least two spokes;

a float configured to be attached to the hub;

a decorative element support bowl configured to be attached to the hub;

at least two spoke end fittings; and a bowl adapter comprising a sidewall, a first lip attached to a first end of the sidewall and configured to securely engage the bowl, and a second lip attached to a second end of the sidewall and configured to engage the plurality of tabs; wherein:

the pockets are configured to receive the spoke end fittings;

each of the spoke end fittings has a first portion, and a second portion attached to the first portion;

the first portion has an opening configured to receive a portion of one of the spokes; and the second portion is configured to securely engage at least one of the interior walls of the hub when the spoke end fitting is positioned in one of the pockets.

9. The floating apparatus of claim 8, wherein the tabs are disposed proximate an upper edge of the hub.

10. The floating apparatus of claim 9, wherein the hub includes a plurality of upper segments, and the tabs are disposed on the upper segments.

11. The floating apparatus of claim 10, wherein the upper segments of the hub and the second lip of the bowl adapter are configured to resiliently deflect in response to contact between the tabs and the second lip when the hub is mated with the bowl adapter.

12. The floating apparatus of claim 11, wherein at least a portion of the second lip of the bowl adapter is disposed at an acute angle in relation to the sidewall of the bowl adapter.

13. The floating apparatus of claim 12, wherein the first lip and the sidewall of the bowl adapter are substantially perpendicular.

* * * * *